(12) United States Patent
Damnjanovic et al.

(10) Patent No.: US 10,009,861 B2
(45) Date of Patent: Jun. 26, 2018

(54) TECHNIQUES FOR ADAPTIVELY ENABLING SYNCHRONIZATION OF NODES USING A LISTEN BEFORE TALK LOAD-BASED EQUIPMENT PROTOCOL

(71) Applicant: QUALCOMM Incorporated, San Diego, CA (US)

(72) Inventors: Aleksandar Damnjanovic, Del Mar, CA (US); Durga Prasad Malladi, San Diego, CA (US); Yongbin Wei, La Jolla, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/875,542

(22) Filed: Oct. 5, 2015

(65) Prior Publication Data
US 2016/0105858 A1 Apr. 14, 2016

Related U.S. Application Data

(60) Provisional application No. 62/063,723, filed on Oct. 14, 2014.

(51) Int. Cl.
*H04W 56/00* (2009.01)
*H04W 16/14* (2009.01)
*H04W 74/08* (2009.01)

(52) U.S. Cl.
CPC ......... *H04W 56/001* (2013.01); *H04W 16/14* (2013.01); *H04W 74/08* (2013.01); *H04W 74/0816* (2013.01)

(58) Field of Classification Search
CPC .................................................. H04W 56/001
(Continued)

(56) References Cited

U.S. PATENT DOCUMENTS

2011/0176465 A1* 7/2011 Panta ................ H04W 52/0235
370/311
2012/0129527 A1* 5/2012 Takeuchi ............ H04W 52/244
455/436

(Continued)

FOREIGN PATENT DOCUMENTS

WO WO-2013164037 A1 11/2013

OTHER PUBLICATIONS

ISA/EPO, International Search Report and Written Opinion of the International Searching Authority, Int'l. App. No. PCT/US2015/054213, Feb. 3, 2016, European Patent Office, Rijswijk, NL, 11 pgs.

*Primary Examiner* — Mang Yeung
*Assistant Examiner* — Peter G Solinsky
(74) *Attorney, Agent, or Firm* — Holland & Hart LLP

(57) ABSTRACT

Techniques are described for wireless communication. A method for wireless communication may include identifying interference at a first node operating in a shared radio frequency spectrum band. The interference may be caused by a second node operating in the shared radio frequency spectrum band. The second node may operate asynchronously to the first node in the shared radio frequency spectrum band. The method may also include adaptively enabling, based at least in part on the identified interference, a synchronization of the first node with at least a third node in the shared radio frequency spectrum band.

28 Claims, 18 Drawing Sheets

(58) Field of Classification Search
USPC .......................................................... 370/329
See application file for complete search history.

(56) References Cited

U.S. PATENT DOCUMENTS

| | | |
|---|---|---|
| 2013/0176934 A1 | 7/2013 | Malladi et al. |
| 2014/0153421 A1 | 6/2014 | Zhou et al. |
| 2014/0198735 A1 | 7/2014 | Koskela et al. |
| 2015/0045076 A1* | 2/2015 | Pan ....................... H04W 16/10 |
| | | 455/501 |
| 2015/0156783 A1* | 6/2015 | Klang .................. H04W 72/082 |
| | | 455/436 |
| 2015/0163805 A1* | 6/2015 | Cattoni ............. H04W 72/0453 |
| | | 370/329 |
| 2016/0043841 A1* | 2/2016 | Lunttila ................ H04L 5/0092 |
| | | 370/280 |
| 2016/0149615 A1* | 5/2016 | Afkhami .................. H04B 3/54 |
| | | 375/257 |
| 2017/0055181 A1* | 2/2017 | Tiirola ................... H04W 28/26 |
| 2017/0094681 A1* | 3/2017 | Takeda .............. H04W 72/1289 |

* cited by examiner

TECHNIQUES FOR ADAPTIVELY ENABLING SYNCHRONIZATION OF NODES USING A LISTEN BEFORE TALK LOAD-BASED EQUIPMENT PROTOCOL

CROSS REFERENCES

The present Application for Patent claims priority to U.S. Provisional Patent Application No. 62/063,723 by Damnjanovic et al., entitled "Techniques for Adaptively Enabling Synchronization of Nodes Using a Listen Before Talk Load-Based Equipment Protocol," filed Oct. 14, 2014, assigned to the assignee hereof, and expressly incorporated by reference herein.

BACKGROUND

Field of the Disclosure

The present disclosure, for example, relates to wireless communication systems, and more particularly to techniques for adaptively enabling a synchronization of nodes that are using a Listen Before Talk (LBT) Load-Based Equipment (LBT-LBE) protocol to contend for access to a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE over a shared radio frequency spectrum band, or over different radio frequency spectrum bands (e.g., a licensed radio frequency spectrum band or a shared radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, an unlicensed radio frequency spectrum band, a base station or UE may perform an LBT procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is available, a channel usage beacon signal (CUBS) may be transmitted to reserve the channel.

In some cases, transmissions by one or more nodes over a shared radio frequency spectrum band (e.g., Wi-Fi nodes, nodes of other operators, or unsynchronized nodes of a same operator) may prevent a base station or UE from winning contention for access to the shared radio frequency spectrum band, resulting in the base station or UE being "starved" of access to the shared radio frequency spectrum band. In some cases, this starvation problem may be mitigated by using an LBT protocol configured for load based equipment (LBT-LBE), instead of an LBT protocol configured for frame based equipment (LBT-FBE), when contending for access to the shared radio frequency spectrum band. When using an LBT-LBE protocol to contend for access to the shared radio frequency spectrum band, an extended CCA procedure including a plurality of N CCA procedures, with N being a random integer between 1 and q, may be performed. The extended CCA procedure may provide a base station or UE a better chance to win access for contention to the shared radio frequency spectrum band (e.g., compared to a single CCA procedure performed in conjunction with an LBT-FBE protocol).

SUMMARY

The present disclosure, for example, relates to one or more techniques for adaptively enabling a synchronization of nodes that are using an LBT-LBE protocol to contend for access to a shared radio frequency spectrum band. The use of an LBT-LBE protocol to contend for access to a shared radio frequency spectrum band can give some nodes of a wireless communication system (e.g., base stations and UEs of a cellular network) a better chance to win access to the shared radio frequency spectrum band. However, when different base stations operated by a same operator use different random values of N to perform N CCAs, a first base station of the operator, using a lower value of N, may win contention for access to the shared radio frequency spectrum band before one or more other base stations of the operator, where the one or more other base stations use a higher value or values of N. As a result, the first base station of the operator may prevent the one or more other base stations of the operator from winning contention for access to the shared radio frequency spectrum band. Because such an intra-operator competition for access to the shared radio frequency spectrum band may be undesirable, an operator may synchronize the value of N used by its base stations, or synchronize the value of N used by different clusters of its base stations. However, for purposes of contending for access to a shared radio frequency spectrum band, synchronizing the value of N used by a cluster of base stations may place all of the base stations in the cluster on par with a single base station or Wi-Fi node that operates asynchronously with respect to the cluster. This can pose a fairness of access issue, in which the single base station or Wi-Fi node (or a smaller number of nodes) is able to win contention for access to the shared radio frequency spectrum band as often as a cluster including a larger number of nodes (e.g., a cluster of base stations). Techniques for mitigating this fairness of access issue are described in this disclosure.

In a first set of illustrative examples, a method for wireless communication is described. In one configuration, the method may include identifying interference at a first node operating in a shared radio frequency spectrum band. The interference may be caused by a second node operating in the shared radio frequency spectrum band. The second node may operate asynchronously to the first node in the shared radio frequency spectrum band. The method may also include adaptively enabling, based at least in part on the identified interference, a synchronization of the first node with at least a third node in the shared radio frequency spectrum band.

In some examples, the method may include enabling the synchronization of the first node with at least the third node when the identified interference fails to satisfy a threshold, and disabling the synchronization of the first node with at least the third node when the identified interference satisfies the threshold. In some examples, the method may include reporting the identified interference to a central node in communication with at least the first node and the third node, and the adaptive enabling may be based at least in part on a command received from the central node.

In some examples of the method, a central node may be in communication with at least the first node and the third node, and the identifying and the adaptive enabling may be performed by the central node. In some examples of the method, identifying the interference at the first node may include receiving an interference indication from the first node. In some examples of the method, the adaptive enabling may include transmitting a command to the first node.

In some examples of the method, identifying the interference at the first node may include receiving an interference indication from the first node at the third node, and the identifying and the adaptive enabling may be performed by the third node. In some examples of the method, the synchronization of the first node with at least the third node may include a synchronization of extended clear channel assessments (ECCAs) performed by the first node and the third node when contending for access to the shared radio frequency spectrum band. In some examples of the method, the identifying and the adaptive enabling may be performed by the first node.

In some examples of the method, the first node may include a first base station. In some examples of the method, the third node may include a second base station, and the first base station and the second base station may be members of a same operator deployment. In some examples of the method, the second node may include a second base station. In these latter examples, the first base station and the second base station may be members of different and unsynchronized operator deployments, or the first base station and the second base station may be unsynchronized base stations of a same operator deployment. In some examples of the method, the second node may include a Wi-Fi node.

In some examples of the method, the first node and the second node may operate in the shared radio frequency spectrum band using different radio access technologies. In some examples of the method, the first node and the second node may operate in the shared radio frequency spectrum band using a same radio access technology.

In a second set of illustrative examples, an apparatus for wireless communication is described. In one configuration, the apparatus may include means for identifying interference at a first node operating in a shared radio frequency spectrum band. The interference may be caused by a second node operating in the shared radio frequency spectrum band. The second node may operate asynchronously to the first node in the shared radio frequency spectrum band. The apparatus may also include means for adaptively enabling, based at least in part on the identified interference, a synchronization of the first node with at least a third node in the shared radio frequency spectrum band. In some examples, the apparatus may further include means for implementing one or more aspects of the method for wireless communication described above with respect to the first set of illustrative examples.

In a third set of illustrative examples, another apparatus for wireless communication is described. The apparatus may include a processor, memory in electronic communication with the processor, and instructions stored in the memory. The instructions may be executable by the processor to identify interference at a first node operating in a shared radio frequency spectrum band. The interference may be caused by a second node operating in the shared radio frequency spectrum band. The second node may operate asynchronously to the first node in the shared radio frequency spectrum band. The instructions may also be executable by the processor to adaptively enable, based at least in part on the identified interference, a synchronization of the first node with at least a third node in the shared radio frequency spectrum band. In some examples, the processor may also be configured to implement one or more aspects of the method for wireless communication described above with respect to the first set of illustrative examples.

In a fourth set of illustrative examples, a computer-readable medium for storing instructions executable by a processor is described. In one configuration, the instructions may include instructions to identify interference at a first node operating in a shared radio frequency spectrum band. The interference may be caused by a second node operating in the shared radio frequency spectrum band. The second node may operate asynchronously to the first node in the shared radio frequency spectrum band. The instructions executable by the processor may also include instructions to adaptively enable, based at least in part on the identified interference, a synchronization of the first node with at least a third node in the shared radio frequency spectrum band. In some examples, the instructions may also include instructions to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
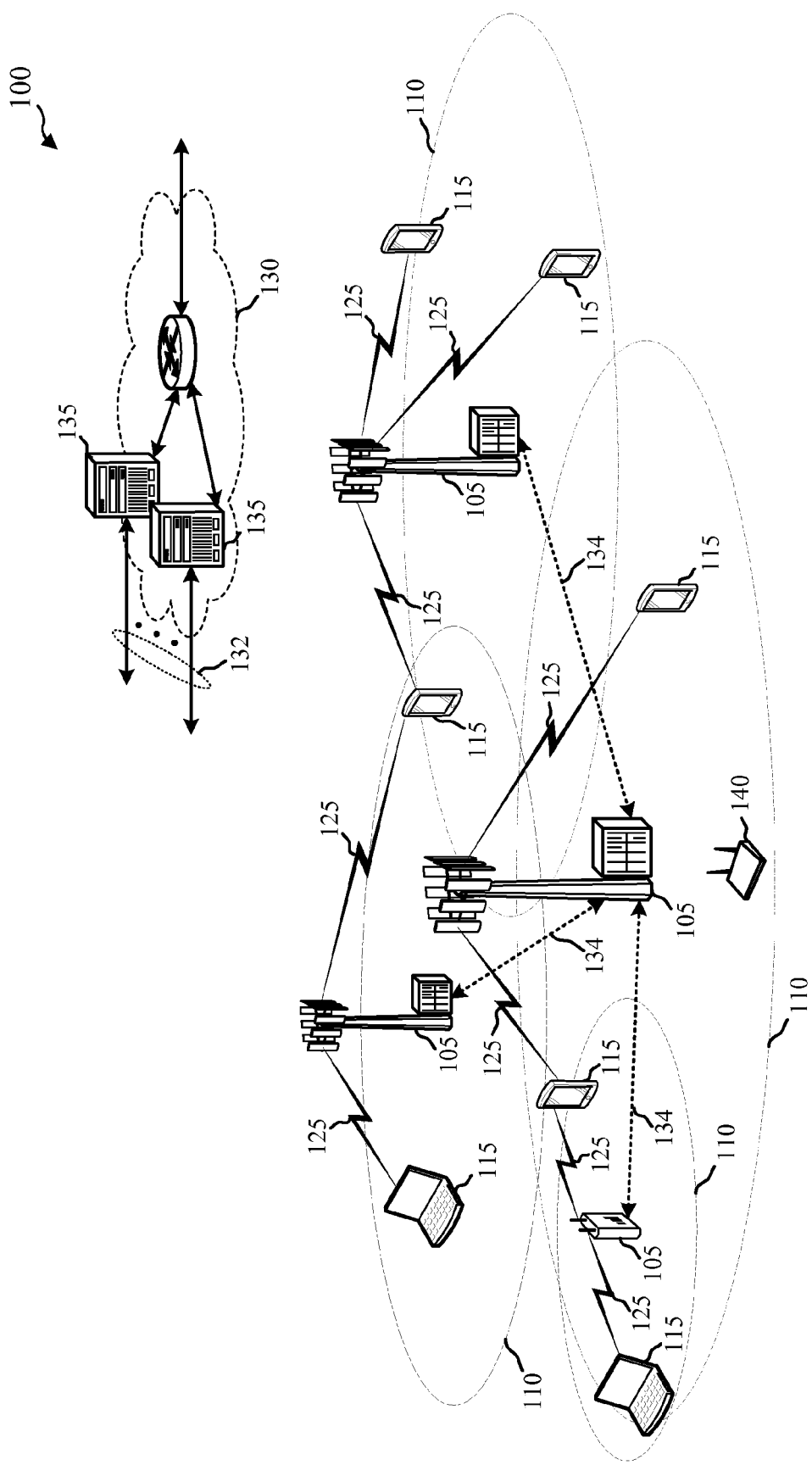
FIG. 1 illustrates an example of a wireless communication system, in accordance with various aspects of the disclosure.

Techniques are described in which a synchronization of nodes using an LBT-LBE protocol to contend for access to a shared radio frequency spectrum band is adaptively enabled. In some examples, the shared radio frequency spectrum band may include a radio frequency spectrum band for which transmitting apparatuses may need to contend for access because the radio frequency spectrum band is available for unlicensed use, such as Wi-Fi use. In some examples, the shared radio frequency spectrum band may be used for cellular communications, such as Long Term Evolution (LTE) communications and/or LTE-Advanced (LTE-A) communications (LTE/LTE-A communications).

A contention-based access protocol such as an LBT-LBE protocol may be used to mitigate the effects of unfair shared access to a wireless communication medium (e.g., starvation of access to an unlicensed radio frequency spectrum band). However, in contrast to an LBT-FBE protocol in which a transmitter performs one CCA procedure per radio frame, with access to a medium being achieved or not achieved based on the outcome of the one CCA procedure, an LBT-LBE protocol requires the performance of an extended CCA procedure. The extended CCA procedure, in turn, involves the performance of a random number of N CCA procedures. The random number, N, may be determined on a transmitter-by-transmitter basis. In the context of a single operator (e.g., a single mobile network operator (MNO) or public land mobile network (PLMN)), the different random numbers generated by the different transmitters associated with the operator may result in transmitters of the same operator competing with one another for access to a medium and, in some cases, one or more transmitters of the operator may prevent one or more other apparatuses of the operator from gaining access to the shared radio frequency spectrum band. Such a scenario may be undesirable.

The techniques described herein may enable a first transmitter (e.g., an evolved Node B (eNB) and/or a base station) to identify a first contention access protocol timing (e.g., a first LBT-LBE protocol timing) and align a second contention access protocol timing (e.g., a second LBT-LBE protocol timing) to the first contention access protocol timing. The second contention access protocol timing may be used by the first transmitter to access a shared radio frequency spectrum band. When other transmitters also align their contention access protocol timings with the first contention access protocol timing, all of the transmitters having their contention access protocol timings so aligned may access the shared radio frequency band in a coordinated manner, without preventing another of the transmitters from accessing the shared radio frequency spectrum band. However, when operation of the transmitters in a coordinated manner may introduce a fairness issue with respect to accessing the shared radio frequency spectrum band, operation of the transmitters in a coordinated manner may be disabled.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. In some examples, the core network 130 may include one or more central nodes 135 (e.g., one or more nodes that are accessible to multiple ones or all of the base stations 105). The base stations 105 may interface with the core network 130 or central nodes 135 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may include wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or other apparatus. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some embodiments of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access because the radio frequency spectrum band is available for unlicensed use, such as Wi-Fi use). Upon winning a contention for access to the shared radio frequency spectrum band, a transmitting apparatus (e.g., a base station 105 or UE 115) may transmit one or more channel usage beacon signals (CUBS) over the shared radio frequency spectrum band. The CUBS may serve to reserve the shared radio frequency spectrum by providing a detectable energy on the shared radio frequency spectrum band. The CUBS may also serve to identify the transmitting apparatus or serve to synchronize the transmitting apparatus and a receiving apparatus.

In some examples, a plurality of nodes of the wireless communication system 100 (e.g., a plurality of base stations) may contend for access to the shared radio frequency spectrum band in a synchronized manner, such that the nodes do not compete against one another for access to the shared radio frequency spectrum band. In other examples, nodes of the wireless communication system 100 may compete against one another for access to the shared radio frequency spectrum band. In the latter case, the base stations 105 shown in FIG. 1 may be operated by a same operator, and may compete for access to the shared radio frequency spectrum band in a synchronized manner. However, a Wi-Fi node 140 may operate asynchronously to the base stations 105. When the Wi-Fi node 140 wins contention for access to the shared radio frequency spectrum band, it can therefore prevent all of the synchronized base stations 105 from winning contention for access to the shared radio frequency spectrum band.

Figure 2:
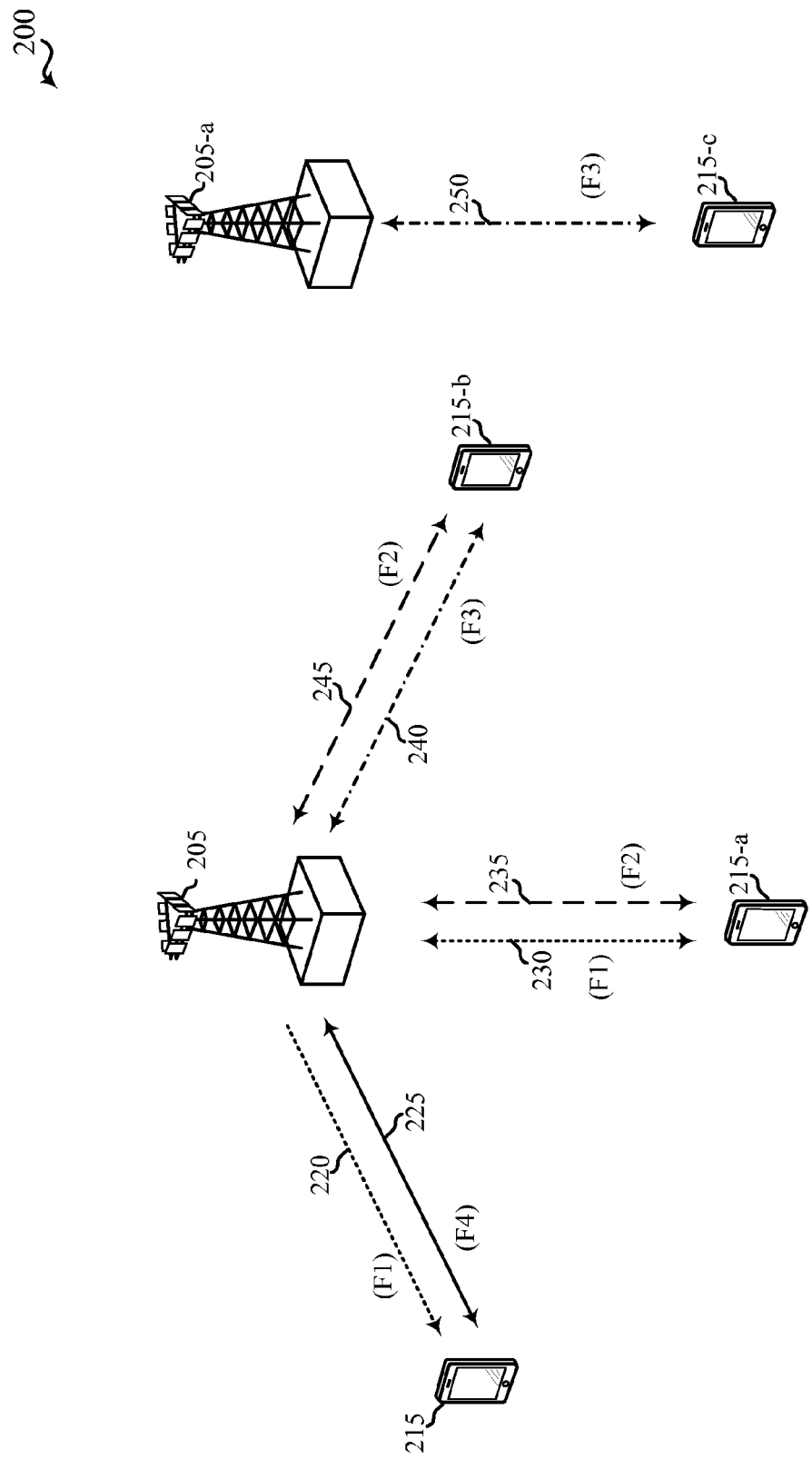
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the shared radio frequency spectrum band and the first bidirectional link 225 in the licensed radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the shared radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
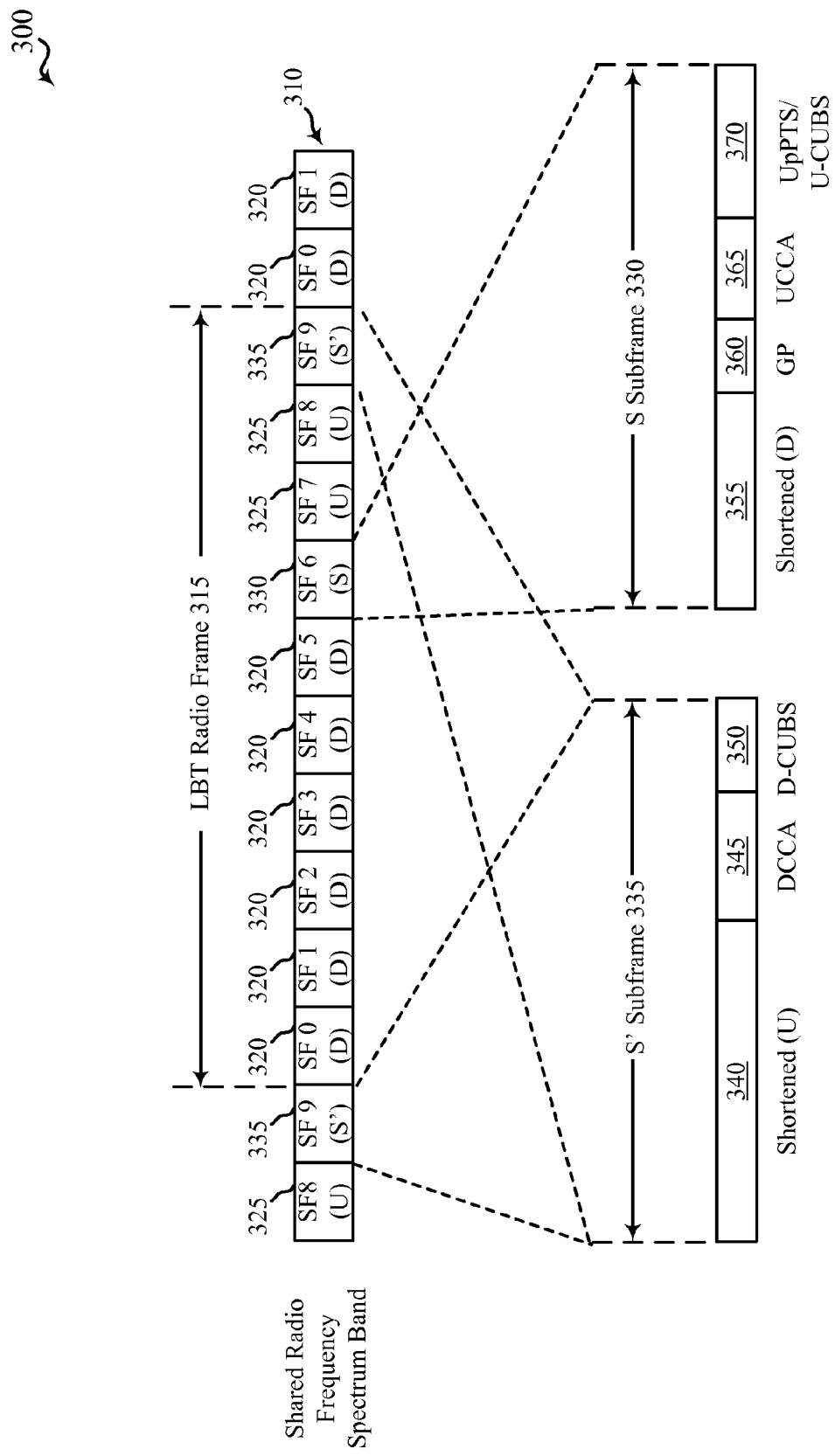
FIG. 3 shows an example of a wireless communication over a shared radio frequency spectrum band, in accordance with various aspects of the present disclosure.

FIG. 3 shows an example 300 of a wireless communication 310 over a shared radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (DCCA) procedure 345 may be performed by one or more base stations, such as one or more of the base stations 105, 205, or 205-a described with reference to FIG. 1 or 2, to reserve, for a period of time, a channel of the shared radio frequency spectrum band over which the wireless communication 310 occurs. Following a successful DCCA procedure 345 by a base station, the base station may transmit a channel usage beacon signal (CUBS) (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the shared radio frequency spectrum band and satisfy one or more regulatory requirements (e.g., a requirement that transmissions over the shared radio frequency spectrum band occupy at least 80% of the available frequency bandwidth). The D-CUBS 350 may in some examples take a form similar to that of an LTE/LTE-A CRS or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the shared radio frequency spectrum band to transmit the D-CUBS 350.

During the S subframe 330, an uplink CCA (UCCA) procedure 365 may be performed by one or more UEs, such as one or more of the UEs 115, 215, 215-a, 215-b, or 215-c described above with reference to FIG. 1 or 2, to reserve, for a period of time, the channel over which the wireless communication 310 occurs. Following a successful UCCA procedure 365 by a UE, the UE may transmit an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the shared radio frequency spectrum band and satisfy one or more regulatory requirements (e.g., the requirement that transmissions over the shared radio frequency spectrum band occupy at least 80% of the available frequency bandwidth). The U-CUBS 370 may in some examples take a form similar to that of an LTE/LTE-A CRS or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the shared radio frequency spectrum band as an uplink pilot time slot (UpPTS) or to transmit the U-CUBS 370.

In some examples, the DCCA procedure 345 or the UCCA procedure 365 may include the performance of a single CCA procedure. In other examples, the DCCA procedure 345 or the UCCA procedure 365 may include the performance of an extended CCA procedure. The extended CCA procedure may include a random number of CCA procedures, and in some examples may include a plurality of CCA procedures. The terms DCCA procedure and UCCA procedure are therefore intended to be broad enough to cover the performance of either a single CCA procedure or an extended CCA procedure. The selection of a single CCA procedure or an extended CCA procedure, for performance by a base station or a UE during an LBT radio frame, may be based on LBT rules. In some cases, the term CCA procedure may be used in this disclosure, in a general sense, to refer to either a single CCA procedure or an extended CCA procedure.

Figure 4A:
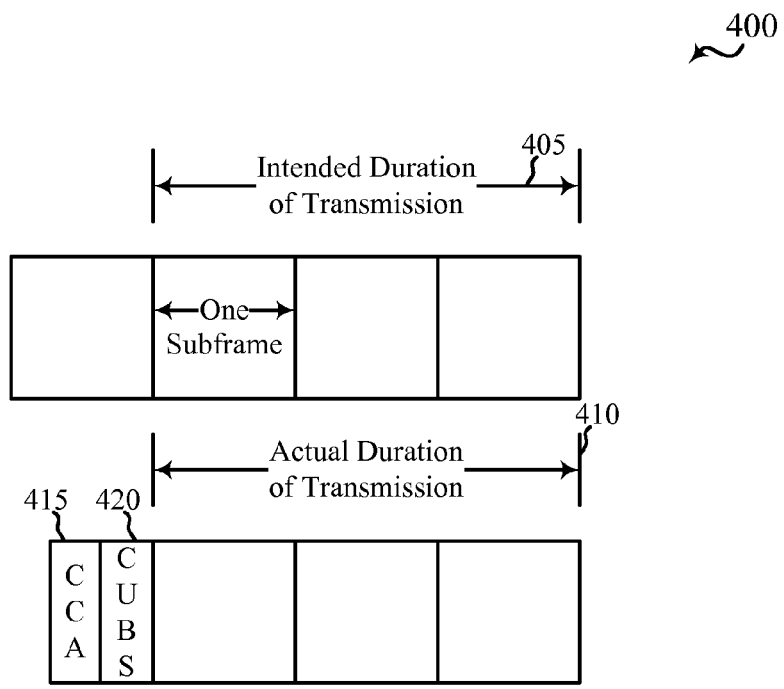
FIG. 4A shows an example of a CCA procedure performed by a transmitting apparatus when contending for access to a shared radio frequency spectrum band, in accordance with various aspects of the present disclosure.

FIG. 4A shows an example 400 of a single CCA procedure 415 performed by a transmitting apparatus when contending for access to a shared radio frequency spectrum band, in accordance with various aspects of the present disclosure. In some examples, the single CCA procedure 415 may be an example of the DCCA procedure 345 or UCCA procedure 365 described with reference to FIG. 3. The single CCA procedure 415 may have a fixed duration (e.g., 20 microseconds). In some examples, the single CCA procedure 415 may be performed in accordance with an LBT-frame based equipment (LBT-FBE) protocol (e.g., the LBT-FBE protocol described by EN 301 893). Following the single CCA procedure 415, a CUBS 420 may be transmitted, followed by a data transmission (e.g., an uplink transmission or a downlink transmission). By way of example, the data transmission may have an intended duration 405 of three subframes and an actual duration 410 of three subframes.

Figure 4B:
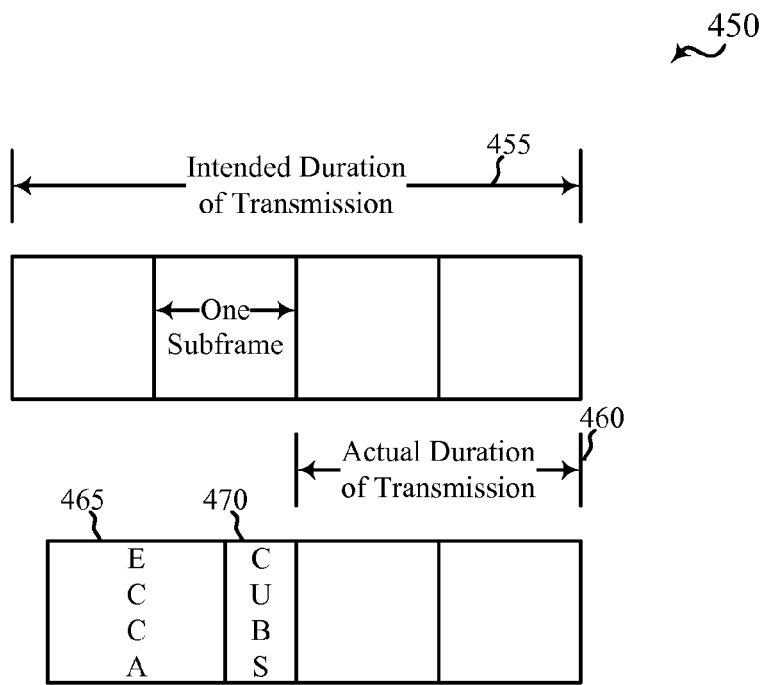
FIG. 4B shows an example of an extended CCA (ECCA) procedure performed by a transmitting apparatus when contending for access to a shared radio frequency spectrum band, in accordance with various aspects of the present disclosure.

FIG. 4B shows an example 450 of an extended CCA (ECCA) procedure 465 performed by a transmitting apparatus when contending for access to a shared radio frequency spectrum band, in accordance with various aspects of the present disclosure. In some examples, the ECCA procedure 465 may be an example of the DCCA procedure 345 or UCCA procedure 365 described with reference to FIG. 3. The ECCA procedure 465 may include a random number of N CCA procedures, and in some examples may include a plurality of CCA procedures. The ECCA procedure 465 may therefore have a variable duration, which variable duration may be longer than the duration of a single CCA procedure. In some examples, the ECCA procedure 465 may be performed in accordance with an LBT-LBE protocol (e.g., the LBT-LBE protocol described by EN 301 893). The ECCA procedure 465 may provide a greater likelihood of winning contention to access the shared radio frequency spectrum band, but at a potential cost of a shorter data transmission. Following the ECCA procedure 465, a CUBS 470 may be transmitted, followed by a data transmission. By way of example, the data transmission may have an intended duration 455 of three subframes and an actual duration 460 of two subframes.

Figure 5:
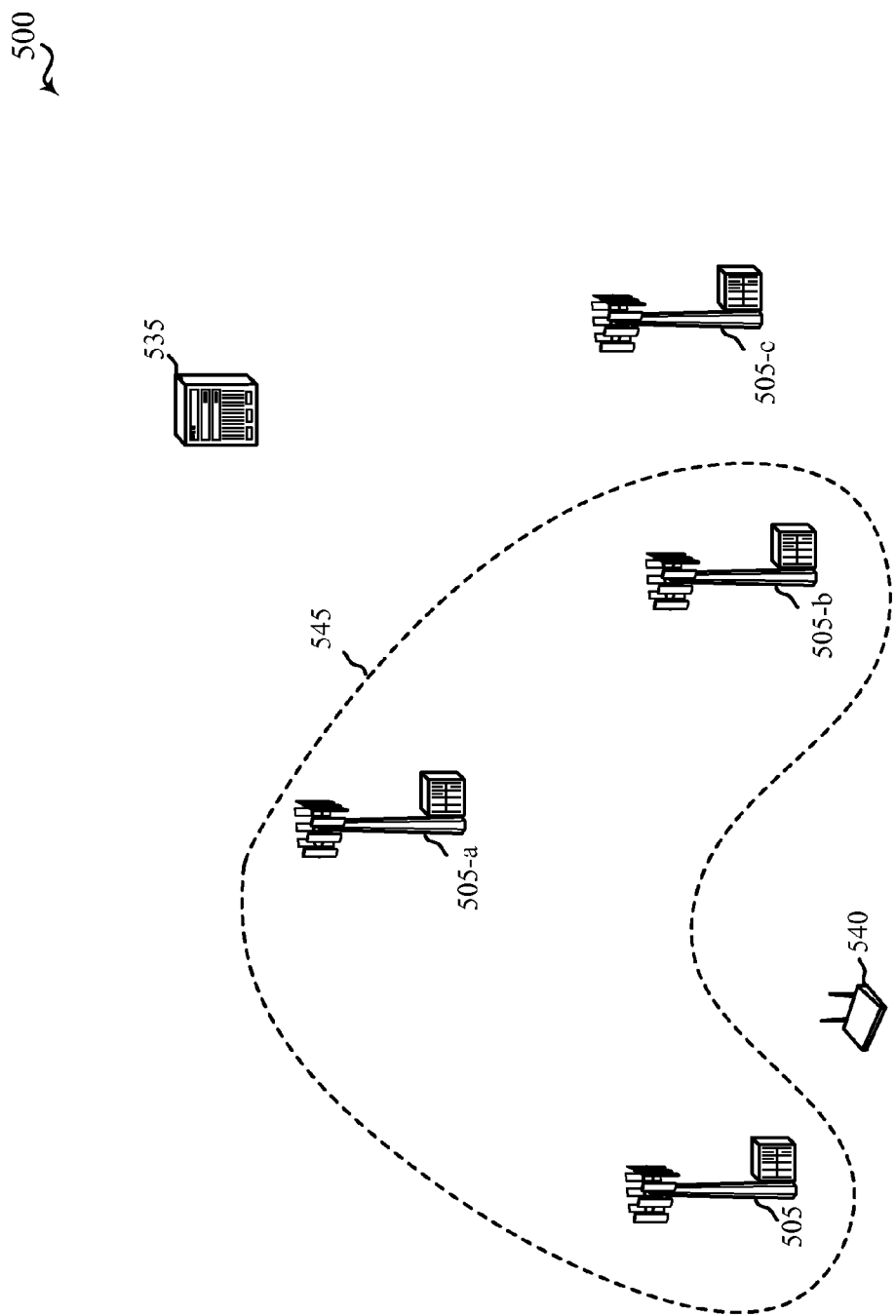
FIG. 5 shows a wireless communication system in which LTE/LTE-A may be deployed under different scenarios using a shared radio frequency spectrum band, in accordance with various aspects of the present disclosure.

FIG. 5 shows a wireless communication system 500 in which LTE/LTE-A may be deployed under different scenarios using a shared radio frequency spectrum band, in accordance with various aspects of the present disclosure. More specifically, FIG. 5 illustrates a wireless communication system 500 in which LTE/LTE-A may be deployed under one or more of the scenarios described with reference to FIG. 2, in accordance with a periodic LBT radio frame (e.g., the LBT radio frame 315 described with reference to FIG. 3), by a plurality of base stations (e.g., a first base station 505, a second base station 505-a, a third base station 505-b, and/or a fourth base station 505-c) and UEs that contend for access to the shared radio frequency spectrum band using the CCA procedure 415 described with reference to FIG. 4A and/or the ECCA procedure 465 described with reference to FIG. 4B. The UEs are not shown in FIG. 5. In some examples of the wireless communication system 500, one or more of the first base station 505, the second base station 505-a, the third base station 505-b, or the fourth base station 505-c may be in a communication with each other or with a central node 535. The wireless communication system 500 may also include a Wi-Fi node 540 that operates in the shared radio frequency spectrum band.

In some examples of the wireless communication system 500, the first base station 505, the second base station 505-a, and the third base station 505-b may be capable of being synchronized, while the fourth base station 505-c may be operated asynchronously to at least one of the first base station 505, the second base station 505-a, or the third base station 505-c. In some examples, the first base station 505, the second base station 505-a, and the third base station 505-b may be operated by a first operator, and the fourth base station 505-c may be operated by a second operator. In other examples, the first base station 505, the second base station 505-a, the third base station 505-b, and the fourth base station 505-c may be operated by a first operator, but the fourth base station 505-c may be operated asynchronously to at least one of the first base station 505, the second base station 505-a, or the third base station 505-b. The Wi-Fi node 540 may also be operated asynchronously to at least one of the first base station 505, the second base station 505-a, or the third base station 505-b.

When the first base station 505, the second base station 505-a, the third base station 505-b, or the fourth base station 505-c contend for access to the shared radio frequency spectrum band using an LBT-FBE protocol, the base station may be starved of access to the shared radio frequency spectrum band if the Wi-Fi node 540 is within a CCA range of the base station (e.g., if operation of the Wi-Fi node 540 is detectable by the base station, or if a detected energy of the Wi-Fi node 540 satisfies a threshold). See, e.g., ETSI EN 301 893 v1.7.1 or v1.7.2. An example of starvation of access to the shared radio frequency spectrum band is described in more detail with reference to FIG. 6.

To mitigate the aforementioned starvation of access issue, one or more of the first base station 505, the second base station 505-a, the third base station 505-b, or the fourth base station 505-c may use an LBT-LBE protocol to contend for access to the shared radio frequency spectrum band. In contrast to an LBT-FBE protocol, an LBT-LBE protocol provides a degree of persistence when accessing the shared radio frequency spectrum band, placing a base station that uses an LBT-LBE protocol more on par with the Wi-Fi node 540 when contending for access to the shared radio frequency spectrum band. However, when a plurality of base stations operated by a same operator use an LBT-LBE protocol to access a shared radio frequency spectrum band, the base stations may compete with one another for access to the shared radio frequency spectrum band. This may be undesirable, and may be mitigated by synchronizing operation of the base stations operated by a same operator (or by synchronizing operation of the base stations within a cluster of base stations). The synchronizing may include synchronizing (e.g., aligning) the performance of ECCA procedures by the base stations (e.g., by ensuring that each of the base stations uses the same value of N, instead of random different values of N). In some examples, operation of the first base station 505, the second base station 505-*a*, and the third base station 505-*b* may be synchronized, as illustrated by the cluster designation 545.

Although synchronization of a plurality of nodes may mitigate the intra-operator competition for access issue, synchronization can also introduce yet another fairness of access issue. That is, synchronization may place all of the base stations in a cluster on par with a single base station (e.g., the fourth base station 505-*c*) or Wi-Fi node (e.g., the Wi-Fi node 540) that operates asynchronously with respect to the cluster. The single base station or Wi-Fi node (or a smaller number of nodes) may therefore be able to win contention for access to the shared radio frequency spectrum band as often as a cluster including a larger number of nodes. Techniques for mitigating this fairness of access issue are described in this disclosure.

Figure 6:
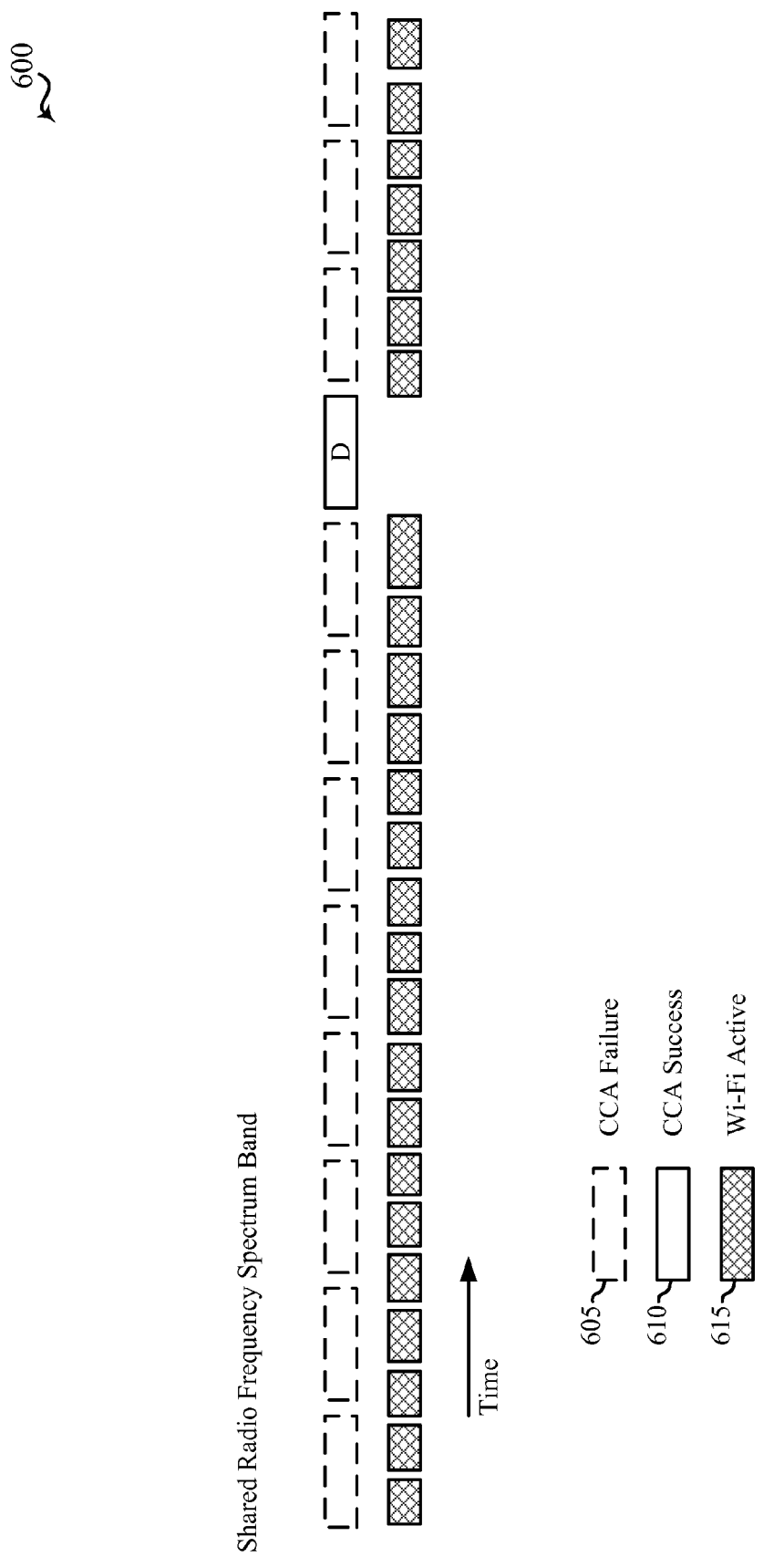
FIG. 6 shows a timing diagram of wireless communications over a shared radio frequency spectrum band, in accordance with various aspects of the present disclosure.

FIG. 6 shows a timing diagram 600 of wireless communications over a shared radio frequency spectrum band, in accordance with various aspects of the present disclosure. In some examples, the shared radio frequency spectrum band may be a radio frequency spectrum band for which transmitting apparatuses may need to contend for access because the radio frequency spectrum band is available for unlicensed use, such as Wi-Fi use. As shown, a Wi-Fi node may win access for contention to the shared radio frequency spectrum band during each of a plurality of Wi-Fi active periods 615. A base station or UE, such as one of the base stations 105, 205, 205-*a*, 505, 505-*a*, 505-*b*, or 505-*c* described with reference to FIG. 1, 2, or 5, or one of the UEs 115, 215, 215-*a*, 215-*b*, or 215-*c* described with reference to FIG. 1 or 2, may contend for access to the shared radio frequency spectrum band using an LBT-FBE protocol during each of a number of LBT radio frames 605, but experience a CCA failure as a result of the Wi-Fi node's use of the shared radio frequency spectrum band. The base station or UE may experience a CCA success, and win contention for access to the shared radio frequency spectrum band during a period 610, once every thirty or so attempts to contend for access to the shared radio frequency spectrum band.

The Wi-Fi node's greater success at winning contention for access to the shared radio frequency spectrum band, as compared to the success (or lack of success) of the base station or UE, can be attributed to the base station or UE attempting access once every few milliseconds (e.g., once every ten milliseconds in the case of the LBT radio frame 315 described with reference to FIG. 3), when a Wi-Fi node having a full transmit buffer may transmit for 3 milliseconds and then attempt access using a persistent protocol in less than 100 microseconds. The base station or UE therefore has (at most) a 1 in 30 chance of winning contention for access to the shared radio frequency spectrum band; and even when the base station or UE wins contention for access to the shared radio frequency spectrum band during an LBT radio frame, it is unlikely that the base station or UE will win contention for access to the shared radio frequency spectrum band in consecutive LBT radio frames. The Wi-Fi node may therefore starve the base station or UE of access to the shared radio frequency spectrum band. This starvation issue may be mitigated by configuring the base station or UE to contend for access to the shared radio frequency spectrum band using an LBT-LBE protocol.

Figure 7:
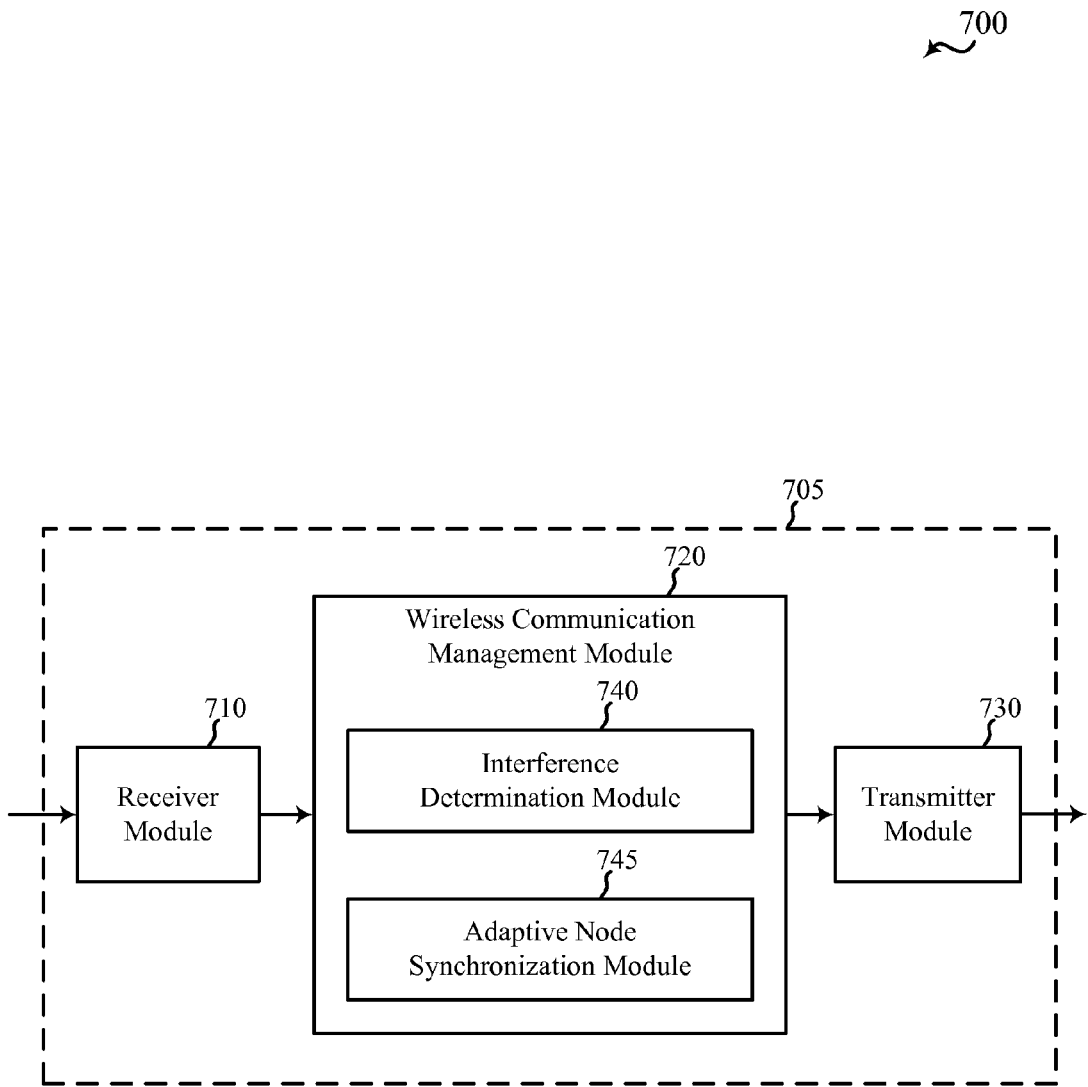
FIG. 7 shows a block diagram of an apparatus for use in wireless communication, in accordance with various aspects of the present disclosure.

FIG. 7 shows a block diagram 700 of an apparatus 7105 for use in wireless communication, in accordance with various aspects of the present disclosure. The apparatus 705 may be an example of aspects of one or more of the base stations 105, 205, 205-*a*, 505, 505-*a*, or 505-*b* described with reference to FIG. 1, 2, or 5, or aspects of the central node 535 described with reference to FIG. 5. The apparatus 705 may also be or include a processor. The apparatus 705 may include a receiver module 710, a wireless communication management module 720, or a transmitter module 730. Each of these modules may be in communication with each other.

The modules of the apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 710 may include a radio frequency (RF) receiver, such as an RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the shared radio frequency spectrum band may be used for LTE/LTE-A communications, as described, for example, with reference to FIG. 1, 2, 3, 4A, 4B, 5, or 6. The receiver module 710 may also or alternatively include a backhaul receiver for communicating with one or more base stations or a central node of a core network. The receiver module 710 may be used to receive various types of data or control signals (i.e., transmissions) over one or more communication links of a wireless communication system or one or more backhaul links of a wired or wireless backhaul, such as one or more communication links or backhaul links of the wireless communication system 100, 200, or 500 described with reference to FIG. 1, 2, or 5.

In some examples, the transmitter module 730 may include an RF transmitter, such as an RF transmitter operable to transmit over the licensed radio frequency spectrum band or the unlicensed radio frequency spectrum band. The transmitter module 730 may also or alternatively include a backhaul transmitter for communicating over a backhaul link with a base station, or with a central node of a core network. The transmitter module 730 may be used to transmit various types of data or control signals (i.e., transmissions) over one or more communication links of a wireless communication system or one or more backhaul links of a wired or wireless backhaul, such as one or more communication links or backhaul links of the wireless communication system 100, 200, or 500 described with reference to FIG. 1, 2, or 5.

In some examples, the wireless communication management module 720 may be used to manage one or more aspects of wireless communication for the apparatus 705 (or for one or more nodes or base stations in communication with the apparatus 705). In some examples, the wireless communication management module 720 may include an interference determination module 740 or an adaptive node synchronization module 745.

An exemplary operation of the interference determination module 740 and adaptive node synchronization module 745 are described with reference to a first node, a second node, and a third node, each of which operates in the shared radio frequency spectrum band. The apparatus 705 may be included in the first node, in the third node, or in a central node in communication with at least the first node and the third node. The second node may operate asynchronously to the first node in the shared radio frequency spectrum band. In some examples, the first node and the second node may operate in the shared radio frequency spectrum band using different radio access technologies or a same radio access technology. In some examples, the first node may include a first base station, and the second node may include a second base station or a Wi-Fi node. When the second node includes a second base station, the first base station and the second base station may be members of different and unsynchronized operator deployments, or the first base station and the second base station may be unsynchronized base stations of a same operator deployment. In some examples, the third node may include a third base station, and the first base station and the third base station may be members of a same operator deployment. In some examples, one or more of the first base station, the second base station, and the third base station may operate as part of an LTE/LTE-A network.

In some examples, the interference determination module 740 may be used to identify interference at a first node operating in the shared radio frequency spectrum band. The interference may be caused by a second node operating in the shared radio frequency spectrum band. The second node may operate asynchronously to the first node in the shared radio frequency spectrum band.

In some examples, the adaptive node synchronization module 745 may be used to adaptively enable, based at least in part on the identified interference, a synchronization of the first node with at least a third node in the shared radio frequency spectrum band.

Figure 8:
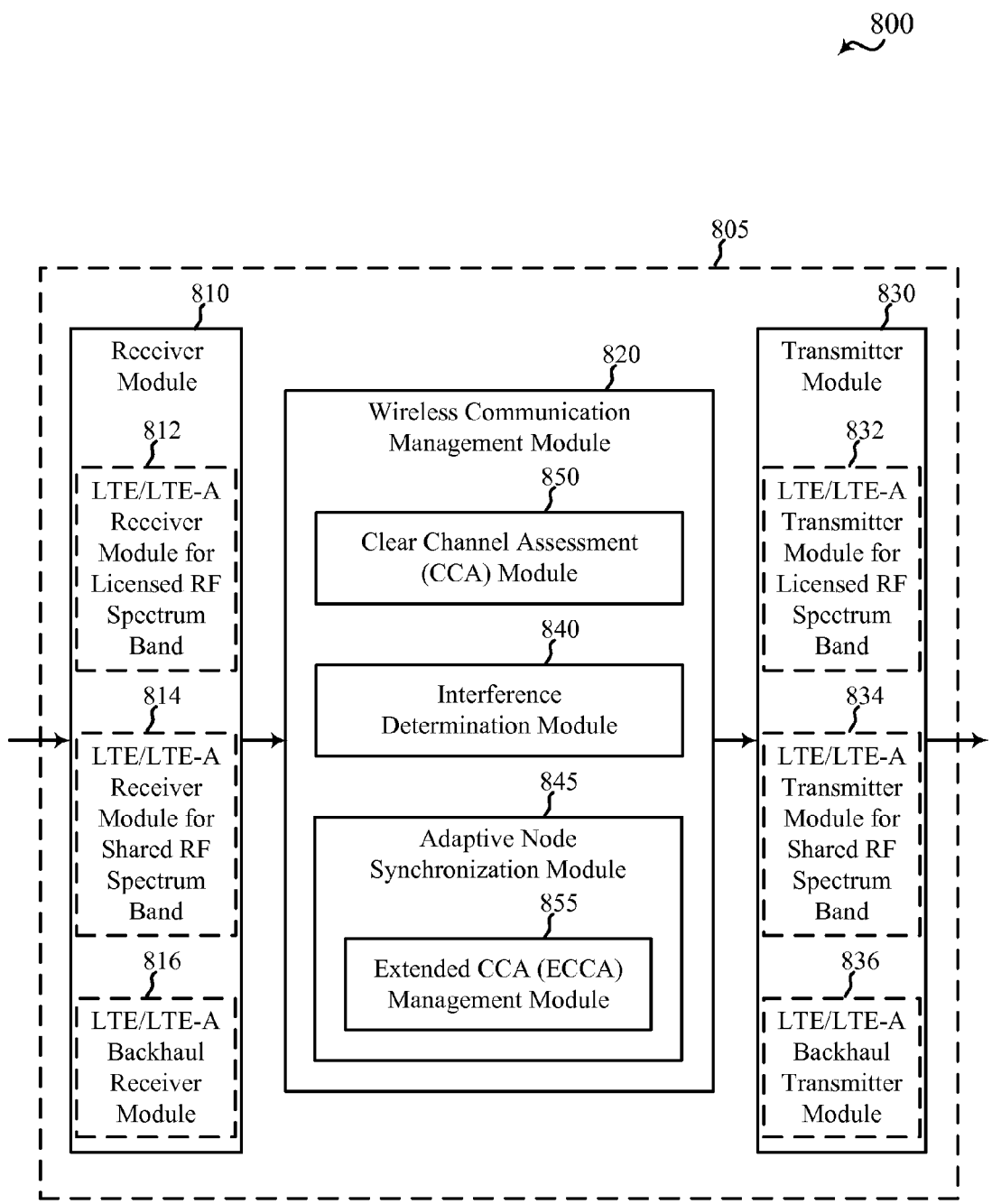
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of one or more of the base stations 105, 205, 205-a, 505, 505-a, or 505-b described with reference to FIG. 1, 2, or 5, or aspects of the apparatus 705 described with reference to FIG. 7. The apparatus 805 may also be or include a processor. The apparatus 805 may include a receiver module 810, a wireless communication management module 820, or a transmitter module 830. Each of these modules may be in communication with each other.

The modules of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 810 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the shared radio frequency spectrum band may be used for LTE/LTE-A communications, as described, for example, with reference to FIG. 1, 2, 3, 4A, 4B, 5, or 6. The receiver module 810 may in some cases include separate receivers for the licensed radio frequency spectrum band and the shared radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 812), and an LTE/LTE-A receiver module for communicating over the shared radio frequency spectrum band (e.g., LTE/LTE-A receiver module for shared RF spectrum band 814). The receiver module 810 may also or alternatively include a backhaul receiver module, such as an LTE/LTE-A backhaul receiver module 816 for communicating with one or more LTE/LTE-A base stations or a central node of an LTE/LTE-A core network. The receiver module 810, including the LTE/LTE-A receiver module for licensed RF spectrum band 812, the LTE/LTE-A receiver module for shared RF spectrum band 814, and/or LTE/LTE-A backhaul receiver module 816, may be used to receive various types of data or control signals (i.e., transmissions) over one or more communication links of a wireless communication system or one or more backhaul links of a wired or wireless backhaul, such as one or more communication links or backhaul links of the wireless communication system 100, 200, or 500 described with reference to FIG. 1, 2, or 5.

In some examples, the transmitter module 830 may include an RF transmitter, such as an RF transmitter operable to transmit over the licensed radio frequency spectrum band or the unlicensed radio frequency spectrum band. The transmitter module 830 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 832), and an LTE/LTE-A transmitter module for communicating over the shared radio frequency spectrum band (e.g., LTE/LTE-A transmitter module for shared RF spectrum band 834). The transmitter module 830 may also or alternatively include a backhaul transmitter module, such as an LTE/LTE-A backhaul transmitter module 836 for communicating with one or more LTE/LTE-A base stations or a central node of an LTE/LTE-A core network. The transmitter module 830, including the LTE/LTE-A transmitter module for licensed RF spectrum band 832, the LTE/LTE-A transmitter module for shared RF spectrum band 834, and/or the LTE/LTE-A backhaul transmitter module 836, may be used to transmit various types of data or control signals (i.e., transmissions) over one or more communication links of a wireless communication system or one or more backhaul links of a wireless communication system, such as one or more communication links or backhaul links of the wireless communication system 100, 200, or 500 described with reference to FIG. 1, 2, or 5.

In some examples, the wireless communication management module 820 may be used to manage one or more aspects of wireless communication for the apparatus 805. In some examples, the wireless communication management module 820 may include a CCA module 850, an interference determination module 840, or an adaptive node synchronization module 845.

An exemplary operation of the CCA module 850, interference determination module 840, and adaptive node synchronization module 845 are described with reference to a first node, a second node, and a third node, each of which operates in the shared radio frequency spectrum band. The apparatus 805 may be included in the first node. The second node may operate asynchronously to the first node in the shared radio frequency spectrum band. In some examples, the first node and the second node may operate in the shared radio frequency spectrum band using different radio access technologies or a same radio access technology. In some examples, the first node may include a first base station, and the second node may include a second base station or a Wi-Fi node. When the second node includes a second base station, the first base station and the second base station may be members of different and unsynchronized operator deployments, or the first base station and the second base station may be unsynchronized base stations of a same operator deployment. In some examples, the third node may include a third base station, and the first base station and the third base station may be members of a same operator deployment. In some examples, one or more of the first base station, the second base station, and the third base station may operate as part of an LTE/LTE-A network.

In some examples, the CCA module 850 may be used to contend for access to the shared radio frequency spectrum band. In some examples, the CCA module 850 may contend for access to the shared radio frequency spectrum band by performing a DCCA, as described, for example, with reference to FIG. 3, 4A, or 4B. The CCA module 850 may be used to perform a CCA or an ECCA, as configured or dynamically determined for accessing the shared radio frequency spectrum band.

In some examples, the interference determination module 840 may be used to identify, at the first node, interference at the first node caused by the second node operating in the shared radio frequency spectrum band. In some examples, the interference determination module 840 may identify the interference at the first node based at least in part on a measured interference level or detectability of the second node. When interference is based on a measured interference level, the interference determination module 840 may, for example, identify interference at the first node by comparing the interference level to a threshold. When interference is identified based on detectability of operation of the second node, the interference determination module 840 may, for example, identify interference based at least in part on the detectability of operation of the second node, or based at least in part on the identity of the second node, or based at least in part on a type of the second node.

In some examples, the adaptive node synchronization module 845 may be used to adaptively enable a synchronization of the first node with at least the third node in the shared radio frequency spectrum band. When it is determined by the interference determination module 840 that the identified interference fails to satisfy a threshold, the adaptive node synchronization module 845 may enable a synchronization of the first node with at least the third node in the shared radio frequency spectrum band. When it is determined by the interference determination module 840 that the identified interference satisfies the threshold, the adaptive node synchronization module 845 may disable the synchronization of the first node with at least the third node in the shared radio frequency spectrum band.

In some examples, the adaptive node synchronization module 845 may include an ECCA management module 855. When it is determined by the interference determination module 840 that the identified interference fails to satisfy the threshold, the ECCA management module 855 may be used to synchronize an ECCA performed by the first node with an ECCA performed by at least the third node. When it is determined by the interference determination module 840 that the identified interference satisfies the threshold, the ECCA management module 855 may allow an ECCA performed by the first node to be performed independently of an ECCA performed by at least the third node.

Figure 9:
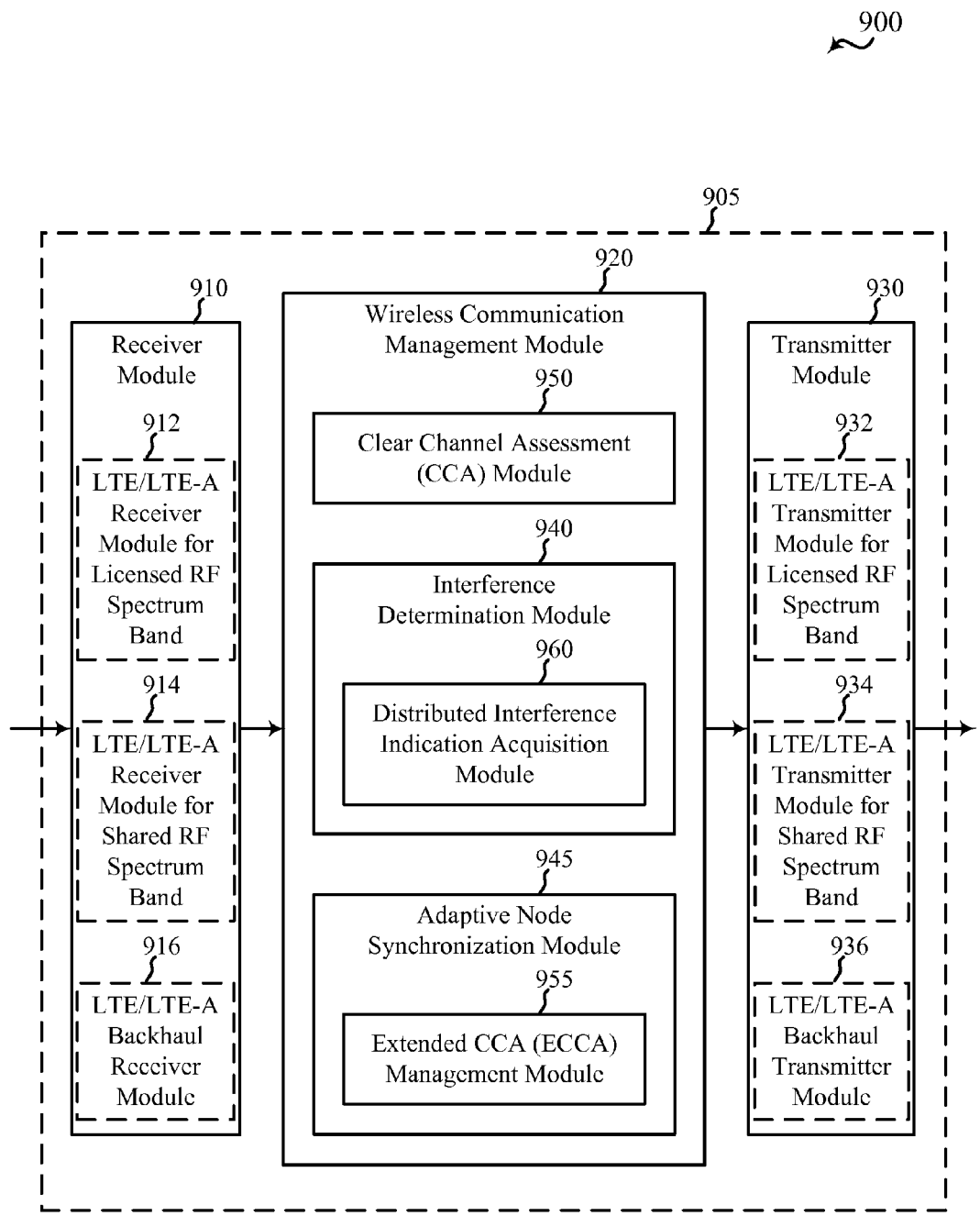
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of one or more of the base stations 105, 205, 205-*a*, 505, 505-*a*, or 505-*b* described with reference to FIG. 1, 2, or 5, or aspects of the apparatus 705 or 805 described with reference to FIG. 7 or 8. The apparatus 905 may also be or include a processor. The apparatus 905 may include a receiver module 910, a wireless communication management module 920, or a transmitter module 930. Each of these modules may be in communication with each other.

The modules of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 910 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the shared radio frequency spectrum band may be used for LTE/LTE-A communications, as described, for example, with reference to FIG. 1, 2, 3, 4A, 4B, 5, or 6. The receiver module 910 may in some cases include separate receivers for the licensed radio frequency spectrum band and the shared radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 912), and an LTE/LTE-A receiver module for communicating over the shared radio frequency spectrum band (e.g., LTE/LTE-A receiver module for shared RF spectrum band 914). The receiver module 910 may also or alternatively include a backhaul receiver module, such as an LTE/LTE-A backhaul receiver module 916 for communicating with one or more LTE/LTE-A base stations or a central node of an LTE/LTE-A core network. The receiver module 910, including the LTE/LTE-A receiver module for licensed RF spectrum band 912, the LTE/LTE-A receiver module for shared RF spectrum band 914, and/or LTE/LTE-A backhaul receiver module 916, may be used to receive various types of data or control signals (i.e., transmissions) over one or more communication links of a wireless communication system or one or more backhaul links of a wired or wireless backhaul, such as one or more communication links or backhaul links of the wireless communication system 100, 200, or 500 described with reference to FIG. 1, 2, or 5.

In some examples, the transmitter module 930 may include an RF transmitter, such as an RF transmitter operable to transmit over the licensed radio frequency spectrum band or the unlicensed radio frequency spectrum band. The transmitter module 930 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 932), and an LTE/LTE-A transmitter module for communicating over the shared radio frequency spectrum band (e.g., LTE/LTE-A transmitter module for shared RF spectrum band 934). The transmitter module 930 may also or alternatively include a backhaul transmitter module, such as an LTE/LTE-A backhaul transmitter module 936 for communicating with one or more LTE/LTE-A base stations or a central node of an LTE/LTE-A core network. The transmitter module 930, including the LTE/LTE-A transmitter module for licensed RF spectrum band 932, the LTE/LTE-A transmitter module for shared RF spectrum band 934, and/or the LTE/LTE-A backhaul transmitter module 936, may be used to transmit various types of data or control signals (i.e., transmissions) over one or more communication links of a wireless communication system or one or more backhaul links of a wireless communication system, such as one or more communication links or backhaul links of the wireless communication system 100, 200, or 500 described with reference to FIG. 1, 2, or 5.

In some examples, the wireless communication management module 920 may be used to manage one or more aspects of wireless communication for the apparatus 905. In some examples, the wireless communication management module 920 may include a CCA module 950, an interference determination module 940, or an adaptive node synchronization module 945.

An exemplary operation of the CCA module 950, interference determination module 940, and adaptive node synchronization module 945 are described with reference to a first node, a second node, and a third node, each of which operates in the shared radio frequency spectrum band. The apparatus 905 may be included in the third node. The second node may operate asynchronously to the first node in the shared radio frequency spectrum band. In some examples, the first node and the second node may operate in the shared radio frequency spectrum band using different radio access technologies or a same radio access technology. In some examples, the first node may include a first base station, and the second node may include a second base station or a Wi-Fi node. When the second node includes a second base station, the first base station and the second base station may be members of different and unsynchronized operator deployments, or the first base station and the second base station may be unsynchronized base stations of a same operator deployment. In some examples, the third node may include a third base station, and the first base station and the third base station may be members of a same operator deployment. In some examples, one or more of the first base station, the second base station, and the third base station may operate as part of an LTE/LTE-A network. In some examples, at least the first node and the third node may be connected via a fast backhaul and may be operable as a synchronized cluster of nodes.

In some examples, the CCA module 950 may be used to contend for access to the shared radio frequency spectrum band. In some examples, the CCA module 950 may contend for access to the shared radio frequency spectrum band by performing a DCCA, as described, for example, with reference to FIG. 3, 4A, or 4B. The CCA module 950 may be used to perform a CCA or an ECCA, as configured or dynamically determined for accessing the shared radio frequency spectrum band.

In some examples, the interference determination module 940 may be used to identify, at the third node, interference at the first node. The interference at the first node may be caused by the second node operating in the shared radio frequency spectrum band.

In some examples, the interference determination module 940 may include a distributed interference indication acquisition module 960, and the distributed interference indication acquisition module 960 may be used to identify the interference at the first node based at least in part on an interference indication received from the first node. The interference indication may include, for example, a measured interference level, an indication that interference exists (which in some examples may take the form of an indication that a measured interference level satisfies a threshold), or an indication that the second node is detectable by the first node. When the interference indication includes a measured interference level, the third node may, for example, identify interference at the first node by comparing the measured interference level to a threshold. When the interference indication includes an indication that interference exists, the third node may, for example, identify interference at the first node based directly on the indication. When the interference indication includes an indication that the second node is detectable by the first node, the third node may, for example, identify interference at the first node based at least in part on the detectability of operation of the second node by the first node, or based at least in part on the identity of the second node, or based at least in part on a type of the second node.

In some examples, the adaptive node synchronization module 945 may be used to adaptively enable a synchronization of the first node with at least the third node in the shared radio frequency spectrum band. When it is determined by the interference determination module 940 that the identified interference fails to satisfy a threshold, the adaptive node synchronization module 945 may enable a synchronization of the first node with at least the third node in the shared radio frequency spectrum band. When it is determined by the interference determination module 940 that the identified interference satisfies the threshold, the adaptive node synchronization module 945 may disable the synchronization of the first node with at least the third node in the shared radio frequency spectrum band.

In some examples, the adaptive node synchronization module 945 may include an ECCA management module 955. When it is determined by the interference determination module 940 that the identified interference fails to satisfy the threshold, the ECCA management module 955 may be used to synchronize an ECCA performed by the third node with an ECCA performed by the first node. When it is determined by the interference determination module 940 that the identified interference satisfies the threshold, the ECCA management module 955 may allow an ECCA performed by the third node to be performed independently of an ECCA performed by third node.

Figure 10:
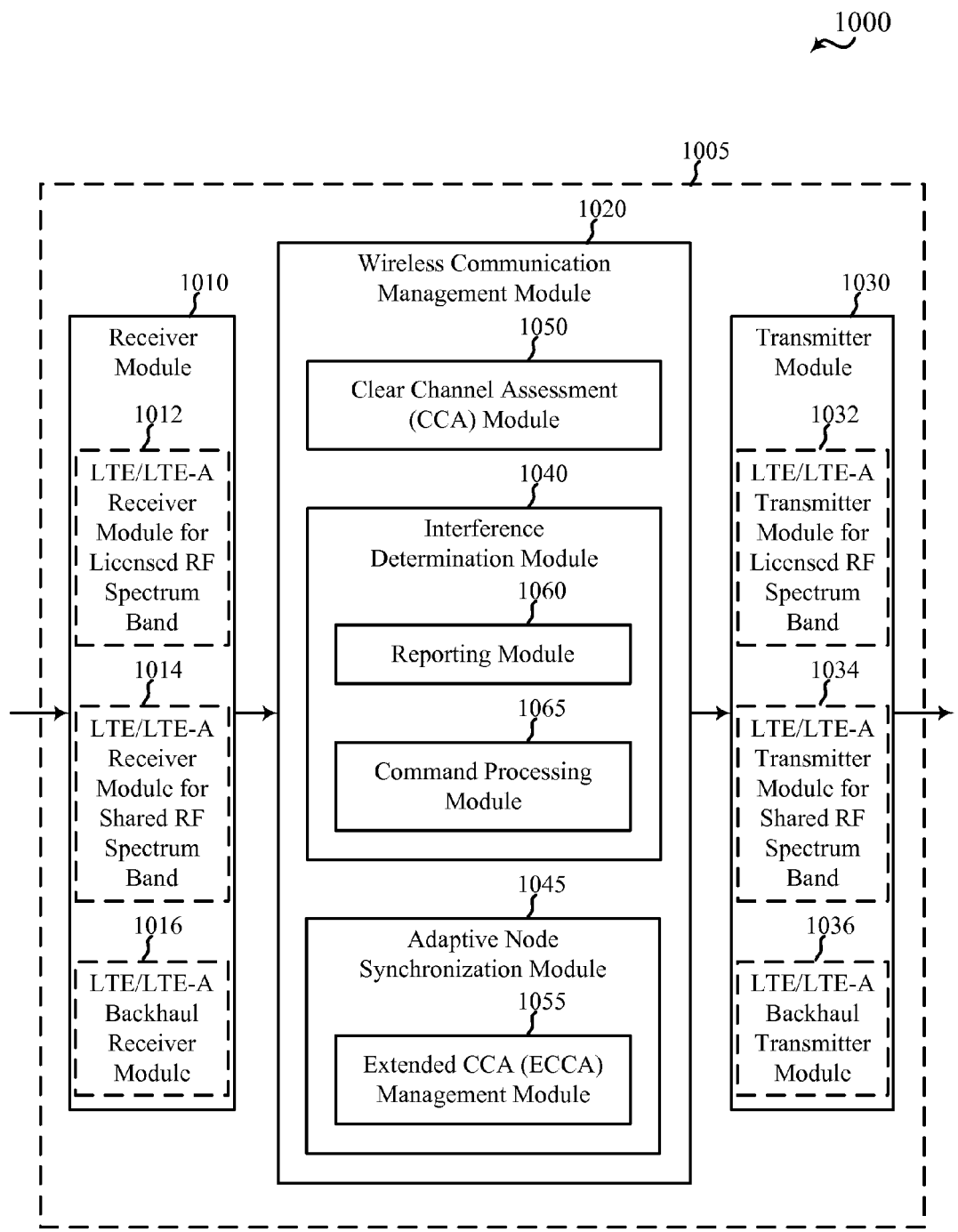
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. The apparatus 1005 may be an example of aspects of one or more of the base stations 105, 205, 205-*a*, 505, 505-*a*, or 505-*b* described with reference to FIG. 1, 2, or 5, or aspects of the apparatus 705, 805, or 905 described with reference to FIG. 7, 8, or 9. The apparatus 1005 may also be or include a processor. The apparatus 1005 may include a receiver module 1010, a wireless communication management module 1020, or a transmitter module 1030. Each of these modules may be in communication with each other.

The modules of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1010 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the shared radio frequency spectrum band may be used for LTE/LTE-A communications, as described, for example, with reference to FIG. 1, 2, 3, 4A, 4B, 5, or 6. The receiver module 1010 may in some cases include separate receivers for the licensed radio frequency spectrum band and the shared radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1012), and an LTE/LTE-A receiver module for communicating over the shared radio frequency spectrum band (e.g., LTE/LTE-A receiver module for shared RF spectrum band 1014). The receiver module 1010 may also or alternatively include a backhaul receiver module, such as an LTE/LTE-A backhaul receiver module 1016 for communicating with one or more LTE/LTE-A base stations or a central node of an LTE/LTE-A core network. The receiver module 1010, including the LTE/LTE-A receiver module for licensed RF spectrum band 1012, the LTE/LTE-A receiver module for shared RF spectrum band 1014, and/or LTE/LTE-A backhaul receiver module 1016, may be used to receive various types of data or control signals (i.e., transmissions) over one or more communication links of a wireless communication system or one or more backhaul links of a wired or wireless backhaul, such as one or more communication links or backhaul links of the wireless communication system 100, 200, or 500 described with reference to FIG. 1, 2, or 5.

In some examples, the transmitter module 1030 may include an RF transmitter, such as an RF transmitter operable to transmit over the licensed radio frequency spectrum band or the unlicensed radio frequency spectrum band. The transmitter module 1030 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1032), and an LTE/LTE-A transmitter module for communicating over the shared radio frequency spectrum band (e.g., LTE/LTE-A transmitter module for shared RF spectrum band 1034). The transmitter module 1030 may also or alternatively include a backhaul transmitter module, such as an LTE/LTE-A backhaul transmitter module 1036 for communicating with one or more LTE/LTE-A base stations or a central node of an LTE/LTE-A core network. The transmitter module 1030, including the LTE/LTE-A transmitter module for licensed RF spectrum band 1032, the LTE/LTE-A transmitter module for shared RF spectrum band 1034, and/or the LTE/LTE-A backhaul transmitter module 1036, may be used to transmit various types of data or control signals (i.e., transmissions) over one or more communication links of a wireless communication system or one or more backhaul links of a wireless communication system, such as one or more communication links or backhaul links of the wireless communication system 100, 200, or 500 described with reference to FIG. 1, 2, or 5.

In some examples, the wireless communication management module 1020 may be used to manage one or more aspects of wireless communication for the apparatus 1005. In some examples, the wireless communication management module 1020 may include a CCA module 1050, an interference determination module 1040, or an adaptive node synchronization module 1045.

An exemplary operation of the CCA module 1050, interference determination module 1040, and adaptive node synchronization module 1045 are described with reference to a first node, a second node, and a third node, each of which operates in the shared radio frequency spectrum band. The apparatus 1005 may be included in the first node. The second node may operate asynchronously to the first node in the shared radio frequency spectrum band. In some examples, the first node and the second node may operate in the shared radio frequency spectrum band using different radio access technologies or a same radio access technology. In some examples, the first node may include a first base station, and the second node may include a second base station or a Wi-Fi node. When the second node includes a second base station, the first base station and the second base station may be members of different and unsynchronized operator deployments, or the first base station and the second base station may be unsynchronized base stations of a same operator deployment. In some examples, the third node may include a third base station, and the first base station and the third base station may be members of a same operator deployment. In some examples, one or more of the first base station, the second base station, and the third base station may operate as part of an LTE/LTE-A network.

In some examples, the CCA module 1050 may be used to contend for access to the shared radio frequency spectrum band. In some examples, the CCA module 1050 may contend for access to the shared radio frequency spectrum band by performing a DCCA, as described, for example, with reference to FIG. 3, 4A, or 4B. The CCA module 1050 may be used to perform a CCA or an ECCA, as configured or dynamically determined for accessing the shared radio frequency spectrum band.

In some examples, the interference determination module 1040 may be used to identify, at the first node, interference at the first node caused by the second node operating in the shared radio frequency spectrum band. In some examples, the interference determination module 1040 may include a reporting module 1060 or a command processing module 1065. The reporting module 1060 may be used to report the identified interference to a central node in communication with at least the first node and the third node. In some examples, reporting the identified interference to the central node may include, for example, reporting a measured interference level, providing an indication that interference exists (which in some examples may take the form of an indication that a measured interference level satisfies a threshold), or providing an indication that the second node is detectable.

The command processing module 1065 may be used to receive a command from the central node. The command may indicate whether a synchronization of the first node with at least the third node, in the shared radio frequency spectrum band, is to be enabled. The command may be based at least in part on the identified interference.

In some examples, the adaptive node synchronization module 1045 may be used to adaptively enable a synchronization of the first node with at least the third node in the shared radio frequency spectrum band. When it is determined by the command processing module 1065 that a received command indicates that synchronization is to be enabled, the adaptive node synchronization module 1045 may enable a synchronization of the first node with at least the third node in the shared radio frequency spectrum band. When it is determined by the interference determination module 1040 that a received command indicates that synchronization is to be disabled, the adaptive node synchronization module 1045 may disable the synchronization of the first node with at least the third node in the shared radio frequency spectrum band.

In some examples, the adaptive node synchronization module 1045 may include an ECCA management module 1055. When it is determined by the interference determination module 1040 that a received command indicates that synchronization is to be enabled, the ECCA management module 1055 may be used to synchronize an ECCA performed by the first node with an ECCA performed by at least the third node. When it is determined by the interference determination module 1040 that a received command indicates that synchronization is to be disabled, the ECCA management module 1055 may allow an ECCA performed by the first node to be performed independently of an ECCA performed by at least the third node.

Figure 11:
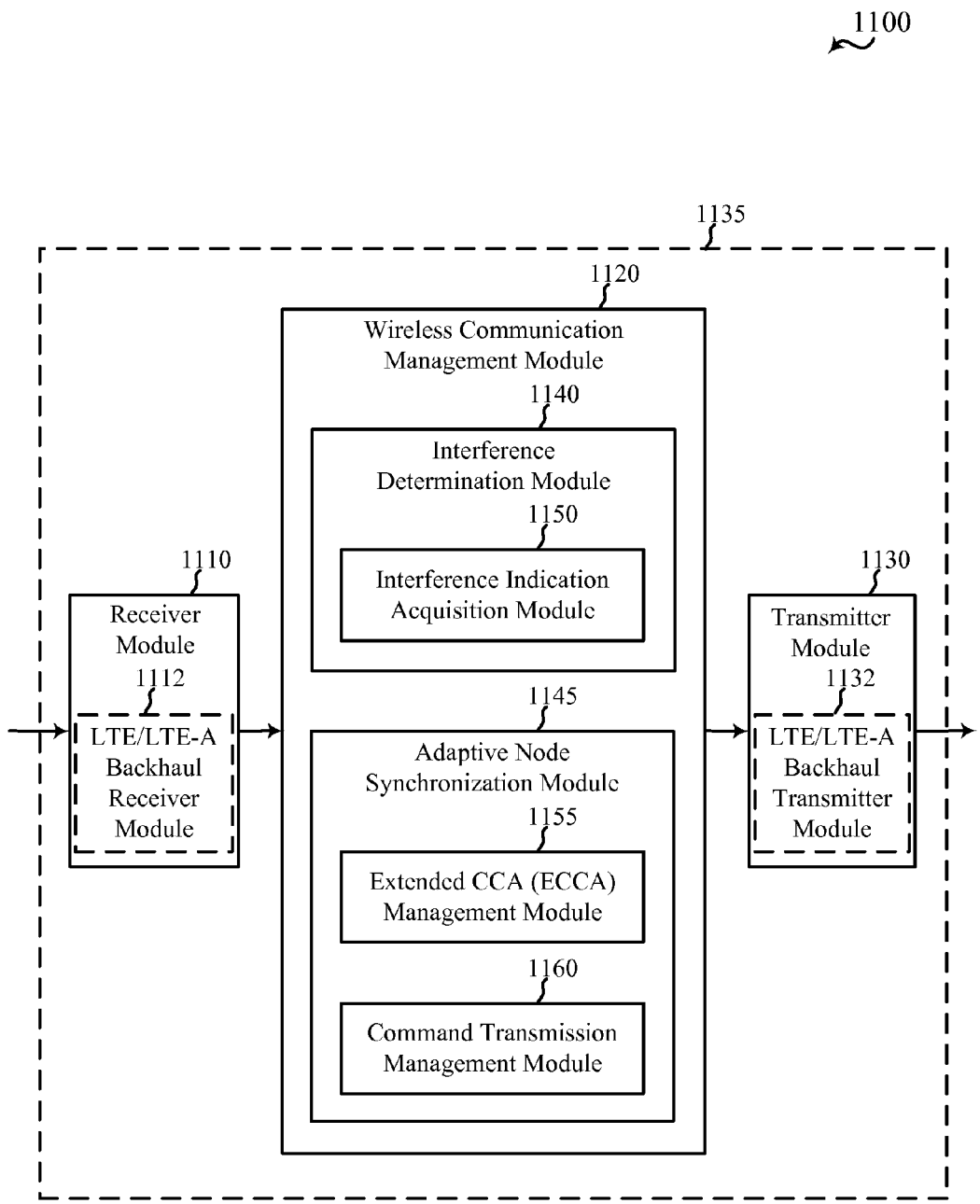
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. The apparatus 1105 may be an example of aspects of the central node 535 described with reference to FIG. 5, or aspects of the apparatus 705 described with reference to FIG. 7. The apparatus 1105 may also be or include a processor. The apparatus 1105 may include a receiver module 1110, a wireless communication management module 1120, or a transmitter module 1130. Each of these modules may be in communication with each other.

The modules of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 may include a backhaul receiver module, such as an LTE/LTE-A backhaul receiver module 1112 for communicating with one or more LTE/LTE-A base stations. The receiver module 1110, including the LTE/LTE-A backhaul receiver module 1112, may be used to receive various types of data or control signals (i.e., transmissions) over one or more backhaul links of a wired or wireless backhaul, such as one or more backhaul links of the wireless communication system 100, 200, or 500 described with reference to FIG. 1, 2, or 5.

In some examples, the transmitter module 1130 may include a backhaul transmitter module, such as an LTE/LTE-A backhaul transmitter module 1132 for communicating with one or more LTE/LTE-A base stations. The transmitter module 1130, including the LTE/LTE-A backhaul transmitter module 1132, may be used to transmit various types of data or control signals (i.e., transmissions) over one or more backhaul links of a wireless communication system, such as one or more backhaul links of the wireless communication system 100, 200, or 500 described with reference to FIG. 1, 2, or 5.

In some examples, the wireless communication management module 1120 may be used to manage one or more aspects of wireless communication for one or more nodes (e.g., base stations) in communication with the apparatus 1105. In some examples, the wireless communication management module 1120 may include an interference determination module 1140 or an adaptive node synchronization module 1145.

An exemplary operation of the interference determination module 1140 and adaptive node synchronization module 1145 are described with reference to a first node, a second node, and a third node, each of which operates in the shared radio frequency spectrum band. The shared radio frequency spectrum band may include a radio frequency spectrum band for which transmitting apparatuses may need to contend for access because the radio frequency spectrum band is available for unlicensed use, such as Wi-Fi use.

The apparatus 1105 may be included in a node that operates as a central node with respect to at least the first node and the third node. The central node may be in communication with at least the first node and the third node. The second node may operate asynchronously to the first node in the shared radio frequency spectrum band. In some examples, the first node and the second node may operate in the shared radio frequency spectrum band using different radio access technologies or a same radio access technology. In some examples, the first node may include a first base station, and the second node may include a second base station or a Wi-Fi node. When the second node includes a second base station, the first base station and the second base station may be members of different and unsynchronized operator deployments, or the first base station and the second base station may be unsynchronized base stations of a same operator deployment. In some examples, the third node may include a third base station, and the first base station and the third base station may be members of a same operator deployment. In some examples, one or more of the first base station, the second base station, and the third base station may operate as part of an LTE/LTE-A network.

In some examples, the interference determination module 1140 may be used to identify, at the central node, interference at the first node caused by the second node operating in the shared radio frequency spectrum band.

In some examples, the interference determination module 940 may include an interference indication acquisition module 1150, and the interference indication acquisition module 1150 may be used to identify the interference at the first node based at least in part on an interference indication received from the first node. The interference indication may include, for example, a measured interference level, an indication that interference exists (which in some examples may take the form of an indication that a measured interference level satisfies a threshold), or an indication that the second node is detectable. When the interference indication includes a measured interference level, the central node may, for example, identify interference at the first node by comparing the measured interference level to a threshold. When the interference indication includes an indication that interference exists, the central node may, for example, identify interference at the first node based directly on the indication. When the interference indication includes an indication that the second node is detectable, the central node may, for example, identify interference at the first node based at least in part on the detectability of operation of the second node, or based at least in part on the identity of the second node, or based at least in part on a type of the second node.

In some examples, the adaptive node synchronization module 1145 may be used to adaptively enable a synchronization of the first node with at least the third node in the shared radio frequency spectrum band. When it is determined by the interference determination module 1140 that the identified interference fails to satisfy a threshold, the adaptive node synchronization module 1145 may enable a synchronization of the first node with at least the third node in the shared radio frequency spectrum band. When it is determined by the interference determination module 1140 that the identified interference satisfies the threshold, the adaptive node synchronization module 1145 may disable the synchronization of the first node with at least the third node in the shared radio frequency spectrum band.

In some examples, the adaptive node synchronization module 1145 may include an ECCA management module 1155 or a command transmission management module 1160. In some examples, the ECCA management module 1155 may be used to enable the synchronization of the first node with at least the third node, in the shared radio frequency spectrum band, by enabling a synchronization of ECCAs performed by at least the first node and the third node when contending for access to the shared radio frequency spectrum band. In some examples, the ECCA management module 1155 may be used to disable the synchronization of the first node with at least the third node, in the shared radio frequency spectrum band, by disabling a synchronization of ECCAs performed by at least the first node and the third node when contending for access to the shared radio frequency spectrum band.

In some examples, the command transmission management module 1160 may be used to enable the synchronization of the first node with at least the third node, in the shared radio frequency spectrum band, by transmitting a synchronization enablement command to at least the first node and/or third node. In some examples, the command transmission management module 1160 may be used to disable the synchronization of the first node with at least the third node, in the shared radio frequency spectrum band, by transmitting a synchronization disablement command to at least the first node and/or third node.

Figure 12:
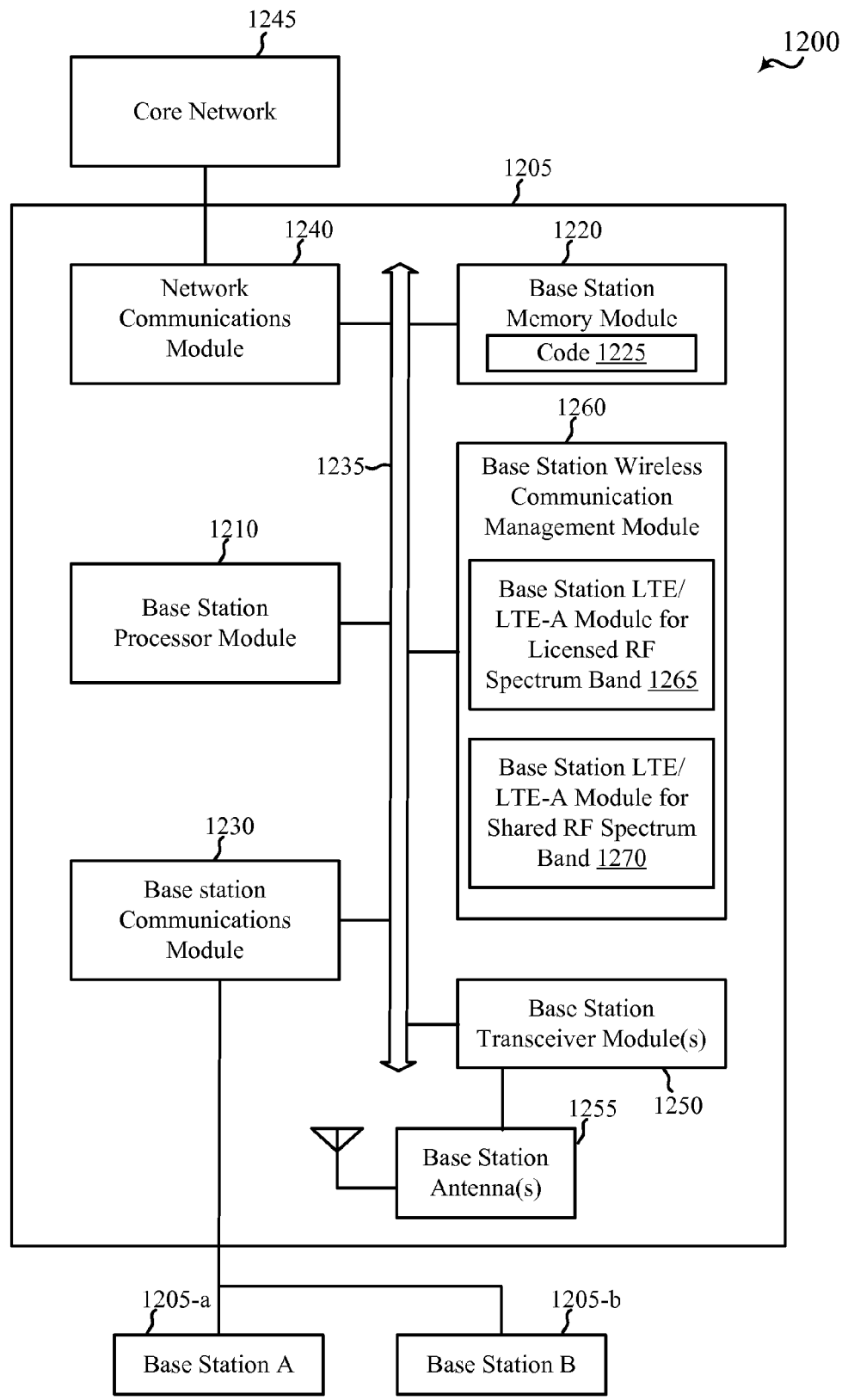
FIG. 12 shows a block diagram of a base station (e.g., a base station forming part or all of an eNB) for use in wireless communication, in accordance with various aspects of the present disclosure.

FIG. 12 shows a block diagram 1200 of a base station 1205 (e.g., a base station forming part or all of an eNB) for use in wireless communication, in accordance with various aspects of the present disclosure. In some examples, the base station 1205 may be an example of one or more aspects of the base station 105, 205, 205-*a*, 505, 505-*a*, or 505-*b* described with reference to FIG. 1, 2, or 5, or aspects of the apparatus 705, 805, 905, or 1005 described with reference to FIG. 7, 8, 9, or 10. The base station 1205 may be configured to implement or facilitate at least some of the base station features and functions described with reference to FIG. 1, 2, 3, 4A, 4B, 5, 6, 7, 8, 9, or 10.

The base station 1205 may include a base station processor module 1210, a base station memory module 1220, at least one base station transceiver module (represented by base station transceiver module(s) 1250), at least one base station antenna (represented by base station antenna(s) 1255), or a base station wireless communication management module 1260. The base station 1205 may also include one or more of a base station communications module 1230 or a network communications module 1240. Each of these components may be in communication with each other, directly or indirectly, over one or more buses 1235.

The base station memory module 1220 may include random access memory (RAM) or read-only memory (ROM). The base station memory module 1220 may store computer-readable, computer-executable code 1225 containing instructions that are configured to, when executed, cause the base station processor module 1210 to perform various functions described herein related to wireless communication, including the adaptive enablement of synchronization with one or more other nodes or base stations operating in a shared radio frequency spectrum band. Alternatively, the code 1225 may not be directly executable by the base station processor module 1210 but be configured to cause the base station 1205 (e.g., when compiled and executed) to perform various of the functions described herein.

The base station processor module 1210 may include an intelligent hardware device, e.g., a central processing unit (CPU), a microcontroller, an ASIC, etc. The base station processor module 1210 may process information received through the base station transceiver module(s) 1250, the base station communications module 1230, or the network communications module 1240. The base station processor module 1210 may also process information to be sent to the transceiver module(s) 1250 for transmission through the antenna(s) 1255, to the base station communications module 1230, for transmission to one or more other base stations 1205-*a* and 1205-*b*, or to the network communications module 1240 for transmission to a core network 1245, which may be an example of one or more aspects of the core network 130 described with reference to FIG. 1. The base station processor module 1210 may handle, alone or in connection with the base station wireless communication management module 1260, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which apparatuses may need to contend for access because the radio frequency spectrum band is available for unlicensed use, such as Wi-Fi use).

The base station transceiver module(s) 1250 may include a modem configured to modulate packets and provide the modulated packets to the base station antenna(s) 1255 for transmission, and to demodulate packets received from the base station antenna(s) 1255. The base station transceiver module(s) 1250 may, in some examples, be implemented as one or more base station transmitter modules and one or more separate base station receiver modules. The base station transceiver module(s) 1250 may support communications in the licensed radio frequency spectrum band or the unlicensed radio frequency spectrum band. The base station transceiver module(s) 1250 may be configured to communicate bi-directionally, via the antenna(s) 1255, with one or more UEs or apparatuses, such as one or more of the UEs 115, 215, 215-*a*, 215-*b*, or 215-*c* described with reference to FIG. 1 or 2. The base station 1205 may, for example, include multiple base station antennas 1255 (e.g., an antenna array). The base station 1205 may communicate with the core network 1245 through the network communications module 1240. The base station 1205 may also communicate with other base stations, such as the base stations 1205-*a* and 1205-*b*, using the base station communications module 1230.

The base station wireless communication management module 1260 may be configured to perform or control some or all of the features or functions described with reference to FIG. 1, 2, 3, 4A, 4B, 5, 6, 7, 8, 9, or 10 related to wireless communication over a licensed radio frequency spectrum band or a shared radio frequency spectrum band. For example, the base station wireless communication management module 1260 may be configured to support a supplemental downlink mode, a carrier aggregation mode, or a standalone mode using the licensed radio frequency spectrum band or the unlicensed radio frequency spectrum band. The base station wireless communication management module 1260 may include a base station LTE/LTE-A module for licensed RF spectrum band 1265 configured to handle LTE/LTE-A communications in the licensed radio frequency spectrum band, and a base station LTE/LTE-A module for shared RF spectrum band 1270 configured to handle LTE/LTE-A communications in the shared radio frequency spectrum band. The base station wireless communication management module 1260, or portions of it, may include a processor, or some or all of the functions of the base station wireless communication management module 1260 may be performed by the base station processor module 1210 or in connection with the base station processor module 1210. In some examples, the base station wireless communication management module 1260 may be an example of the wireless communication management module 720, 820, 920, or 1020 described with reference to FIG. 7, 8, 9, or 10.

Figure 13:
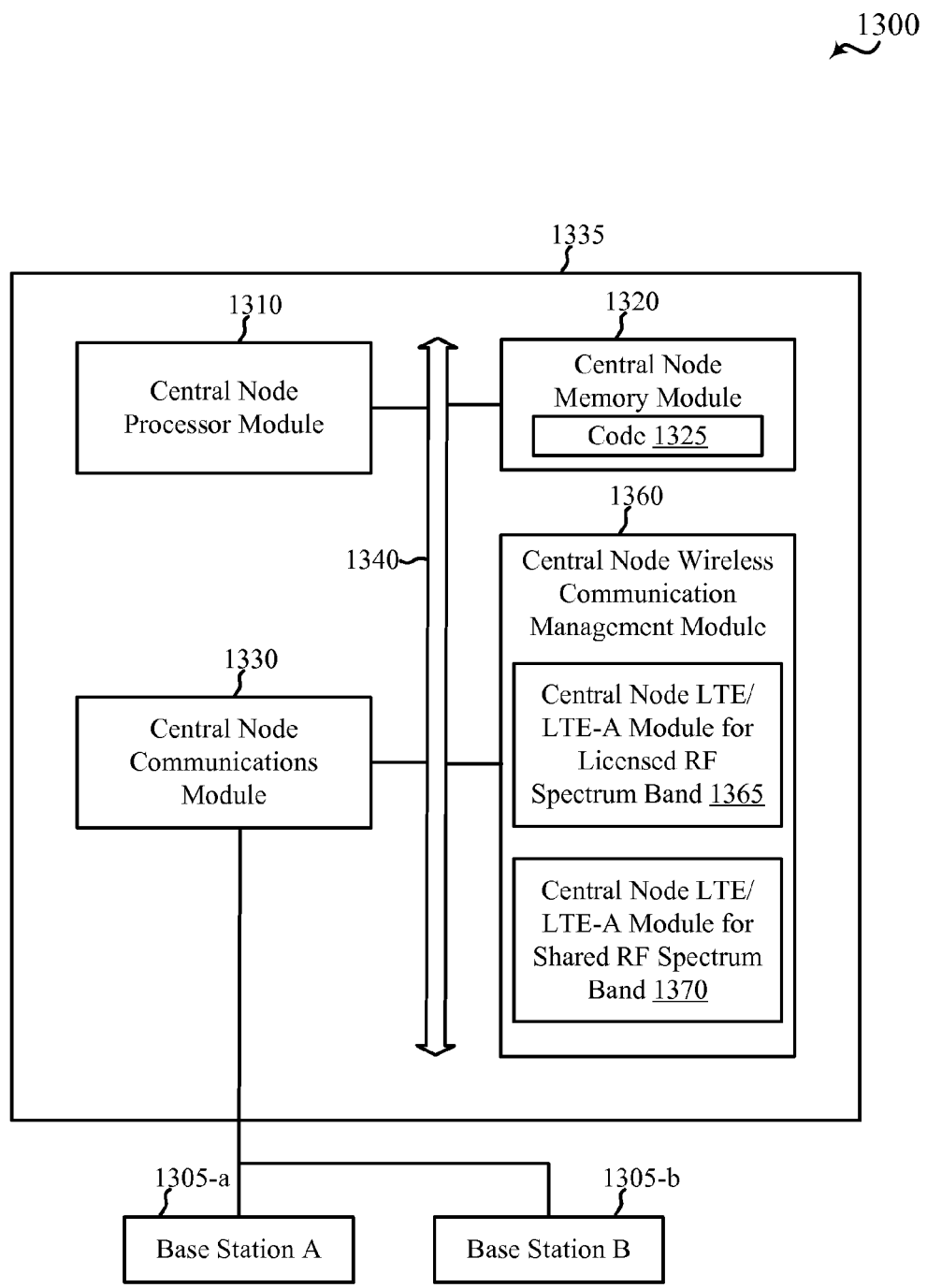
FIG. 13 shows a block diagram of a central node (e.g., a node of a core network) for use in wireless communication, in accordance with various aspects of the present disclosure.

FIG. 13 shows a block diagram 1300 of a central node 1335 (e.g., a node of the core network 130 or 1245 described with reference to FIG. 1 or 12) for use in wireless communication, in accordance with various aspects of the present disclosure. In some examples, the central node 1335 may be an example of one or more aspects of the central node 535 described with reference to FIG. 5, or aspects of the apparatus 1105 described with reference to FIG. 11. The central node 1335 may be configured to implement or facilitate at least some of the central node features and functions described with reference to FIG. 5, or 11.

The central node 1335 may include a central node processor module 1310, a central node memory module 1320, or a central node wireless communication management module 1360. The central node 1335 may also include a central node communications module 1330. Each of these components may be in communication with each other, directly or indirectly, over one or more buses 1340.

The central node memory module 1320 may include RAM or ROM. The central node memory module 1320 may store computer-readable, computer-executable code 1325 containing instructions that are configured to, when executed, cause the central node processor module 1310 to perform various functions described herein related to wireless communication, including the adaptive enablement of synchronization between nodes or base stations operating in a shared radio frequency spectrum band. Alternatively, the code 1325 may not be directly executable by the central node processor module 1310 but be configured to cause the central node 1335 (e.g., when compiled and executed) to perform various of the functions described herein.

The central node processor module 1310 may include an intelligent hardware device, e.g., a CPU, a microcontroller, an ASIC, etc. The central node processor module 1310 may process information received through the central node communications module 1330 from one or more base stations 1305-*a* and 1305-*b*. The central node processor module 1310 may also process information to be sent to the central node communications module 1330, for transmission to the one or more base stations 1305-*a* and 1305-*b*. The central node processor module 1310 may handle, alone or in connection with the central node wireless communication management module 1360, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which apparatuses may need to contend for access because the radio frequency spectrum band is available for unlicensed use, such as Wi-Fi use).

The central node wireless communication management module 1360 may be configured to perform or control some or all of the features or functions described with reference to FIG. 1, 2, 3, 4A, 4B, 5, 6, or 11 related to wireless communication over a licensed radio frequency spectrum band or a shared radio frequency spectrum band. For example, the central node wireless communication management module 1360 may be configured to support a supplemental downlink mode, a carrier aggregation mode, or a standalone mode using the licensed radio frequency spectrum band or the unlicensed radio frequency spectrum band. The central node wireless communication management module 1360 may include a central node LTE/LTE-A module for licensed RF spectrum band 1365 configured to handle LTE/LTE-A communications in the licensed radio frequency spectrum band, and a central node LTE/LTE-A module for shared RF spectrum band 1370 configured to handle LTE/LTE-A communications in the shared radio frequency spectrum band. The central node wireless communication management module 1360, or portions of it, may include a processor, or some or all of the functions of the central node wireless communication management module 1360 may be performed by the central node processor module 1310 or in connection with the central node processor module 1310. In some examples, the central node wireless communication management module 1360 may be an example of the wireless communication management module 1120 described with reference to FIG. 11.

Figure 14:
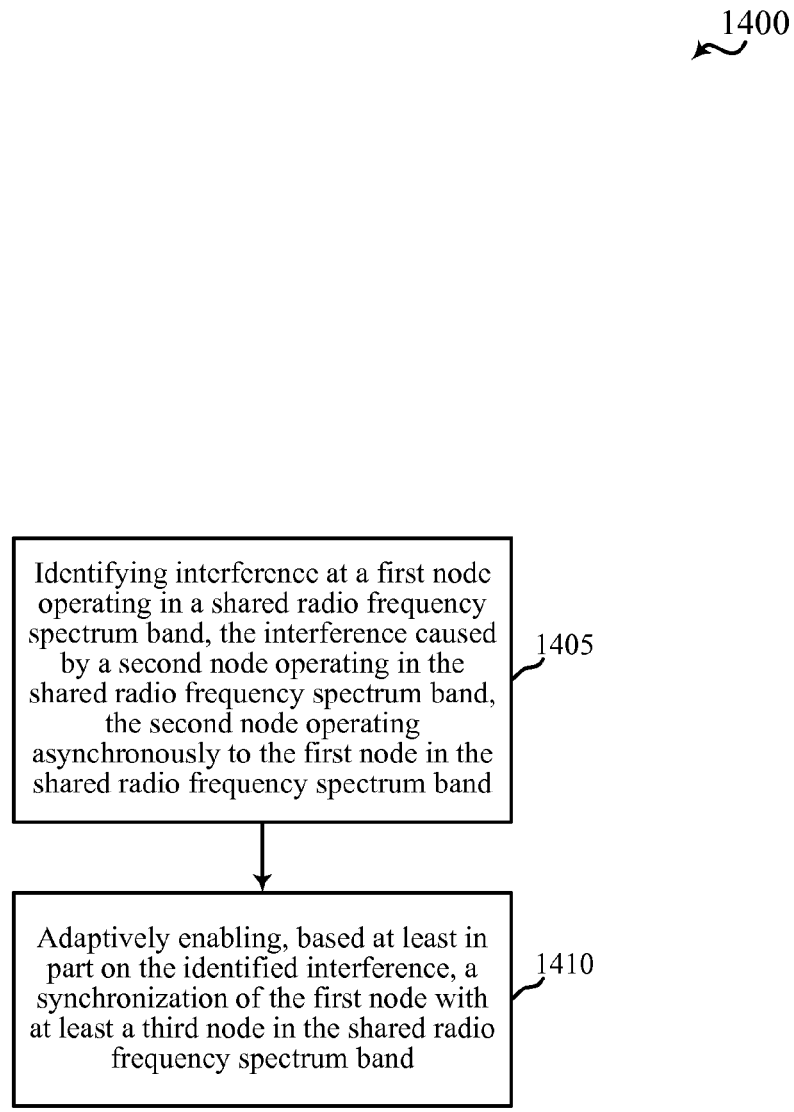
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the base stations 105, 205, 205-a, 505, 505-a, 505-b, or 1205 described with reference to FIG. 1, 2, 5, or 12, aspects of one or more of the central nodes 135, 535, or 1335 described with reference to FIG. 1, 5, or 13, or aspects of one or more of the apparatuses 705, 805, 905, 1005, or 1135 described with reference to FIG. 7, 8, 9, 10, or 11. In some examples, a base station, central node, or apparatus may execute one or more sets of codes to control the functional elements of the base station, central node, or apparatus to perform the functions described below. Additionally or alternatively, the base station, central node, or apparatus may perform one or more of the functions described below using special-purpose hardware.

At block 1405, the method 1400 may include identifying interference at a first node operating in a shared radio frequency spectrum band. The interference may be caused by a second node operating in the shared radio frequency spectrum band. The second node may operate asynchronously to the first node in the shared radio frequency spectrum band. The shared radio frequency spectrum band may include a radio frequency spectrum band for which transmitting apparatuses may need to contend for access because the radio frequency spectrum band is available for unlicensed use, such as Wi-Fi use. The operation(s) at block 1405 may be performed using the wireless communication management module 720, 820, 920, 1020, 1120, 1260, or 1360 described with reference to FIG. 7, 8, 9, 10, 11, 12, or 13, or the interference determination module 740, 840, 940, 1040, or 1140 described with reference to FIG. 7, 8, 9, 10, or 11.

At block 1410, the method 1400 may include adaptively enabling, based at least in part on the identified interference, a synchronization of the first node with at least a third node in the shared radio frequency spectrum band. The operation(s) at block 1410 may be performed using the wireless communication management module 720, 820, 920, 1020, 1120, 1260, or 1360 described with reference to FIG. 7, 8, 9, 10, 11, 12, or 13, or the adaptive node synchronization module 745, 845, 945, 1045, or 1145 described with reference to FIG. 7, 8, 9, 10, or 11.

The first node and the second node may operate in the shared radio frequency spectrum band using different radio access technologies or a same radio access technology. In some examples, the first node may include a first base station, and the second node may include a second base station or a Wi-Fi node. When the second node includes a second base station, the first base station and the second base station may be members of different and unsynchronized operator deployments, or the first base station and the second base station may be unsynchronized base stations of a same operator deployment. In some examples, the third node may include a third base station, and the first base station and the third base station may be members of a same operator deployment. In some examples, one or more of the first base station, the second base station, and the third base station may operate as part of an LTE/LTE-A network.

Thus, the method 1400 may provide for wireless communication. It should be noted that the method 1400 is just one implementation and that the operations of the method 1400 may be rearranged or otherwise modified such that other implementations are possible.

Figure 15:
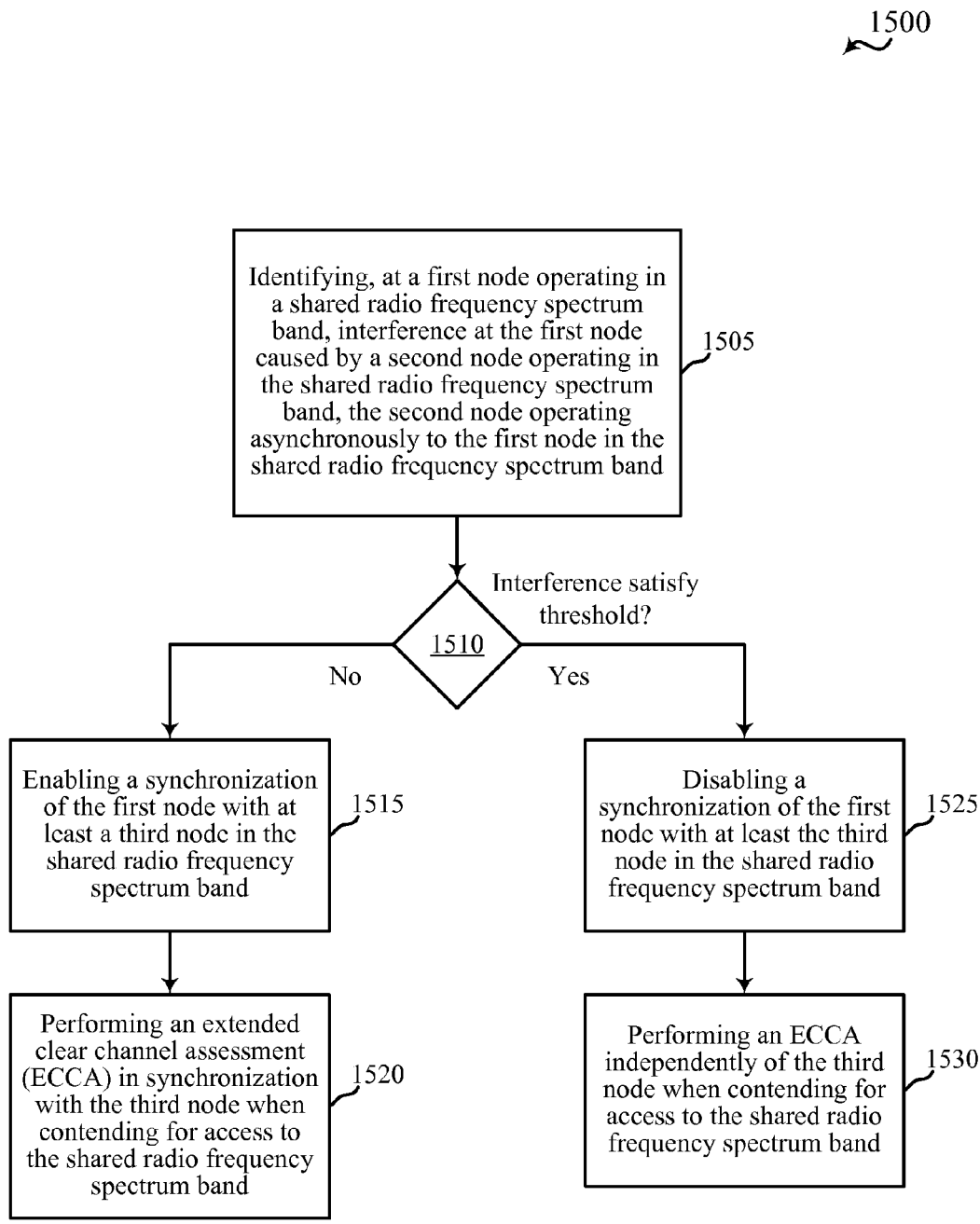
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the base stations 105, 205, 205-a, 505, 505-a, 505-b, or 1205 described with reference to FIG. 1, 2, 5, or 12, or aspects of one or more of the apparatuses 705, 805, 905, or 1005 described with reference to FIG. 7, 8, 9, or 10. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1505, the method 1500 may include identifying, at a first node operating in a shared radio frequency spectrum band, interference at the first node caused by a second node operating in the shared radio frequency spectrum band. The second node may operate asynchronously to the first node in the shared radio frequency spectrum band. The shared radio frequency spectrum band may include a radio frequency spectrum band for which transmitting apparatuses may need to contend for access because the radio frequency spectrum band is available for unlicensed use, such as Wi-Fi use.

In some examples, the first node may identify the interference at the first node based at least in part on a measured interference level or detectability of operation of the second node. When interference is based on a measured interference level, the first node may, for example, identify interference at the first node by comparing the interference level to a threshold. When interference is identified based on detectability of operation of the second node, interference may be identified based at least in part on the detectability of operation of the second node, or based at least in part on the identity of the second node, or based at least in part on a type of the second node.

The operation(s) at block 1505 may be performed using the wireless communication management module 720, 820, 920, 1020, or 1260 described with reference to FIG. 7, 8, 9, 10, or 12, or the interference determination module 740, 840, 940, or 1040 described with reference to FIG. 7, 8, 9, or 10.

At block 1510, the method 1500 may include determining whether the identified interference satisfies a threshold. When the identified interference fails to satisfy the threshold, the method 1500 may continue at block 1515. When the identified interference satisfies the threshold, the method 1500 may continue at block 1525. Alternatively, block 1510 may select a subsequent flow for the method 1500 based at least in part on whether interference at the first node exists. The operation(s) at block 1510 may be performed using the wireless communication management module 720, 820, 920, 1020, or 1260 described with reference to FIG. 7, 8, 9, 10, or 12, or the interference determination module 740, 840, 940, or 1040 described with reference to FIG. 7, 8, 9, or 10.

At block 1515 or 1525, the method 1500 may include adaptively enabling or disabling a synchronization of the first node with at least a third node in the shared radio frequency spectrum band. The adaptive enabling or disabling may be based at least in part on the determination made at block 1510. At block 1515, and when it is determined at block 1510 that the identified interference fails to satisfy the threshold, the method 1500 may include enabling the synchronization of the first node with at least the third node in the shared radio frequency spectrum band. The operation(s) at block 1515 may be performed using the wireless communication management module 720, 820, 920, 1020, or 1260 described with reference to FIG. 7, 8, 9, 10, or 12, or the adaptive node synchronization module 745, 845, 945, or 1045 described with reference to FIG. 7, 8, 9, or 10.

At block 1520, the method 1500 may include performing an ECCA in synchronization with the third node when contending for access to the shared radio frequency spectrum band. The operation(s) at block 1520 may be performed using the wireless communication management module 720, 820, 920, 1020, or 1260 described with reference to FIG. 7, 8, 9, 10, or 12, the adaptive node synchronization module 745, 845, 945, or 1045 described with reference to FIG. 7, 8, 9, or 10, or the ECCA management module 855, 955, or 1055 described with reference to FIG. 8, 9, or 10.

At block 1525, and when it is determined at block 1510 that the identified interference satisfies the threshold, the method 1500 may include disabling the synchronization of the first node with at least the third node in the shared radio frequency spectrum band. The operation(s) at block 1525 may be performed using the wireless communication management module 720, 820, 920, 1020, or 1260 described with reference to FIG. 7, 8, 9, 10, or 12, or the adaptive node synchronization module 745, 845, 945, or 1045 described with reference to FIG. 7, 8, 9, or 10.

At block 1530, the method 1500 may include performing an ECCA independently of the third node when contending for access to the shared radio frequency spectrum band. The operation(s) at block 1530 may be performed using the wireless communication management module 720, 820, 920, 1020, or 1260 described with reference to FIG. 7, 8, 9, 10, or 12, the adaptive node synchronization module 745, 845, 945, or 1045 described with reference to FIG. 7, 8, 9, or 10, or the ECCA management module 855, 955, or 1055 described with reference to FIG. 8, 9, or 10.

In some examples of the method 1500, the operations performed at each of blocks 1505, 1510, 1515, 1520, 1525, and/or 1530 may be performed by the first node. The first node and the second node may operate in the shared radio frequency spectrum band using different radio access technologies or a same radio access technology. In some examples, the first node may include a first base station, and the second node may include a second base station or a Wi-Fi node. When the second node includes a second base station, the first base station and the second base station may be members of different and unsynchronized operator deployments, or the first base station and the second base station may be unsynchronized base stations of a same operator deployment. In some examples, the third node may include a third base station, and the first base station and the third base station may be members of a same operator deployment. In some examples, one or more of the first base station, the second base station, and the third base station may operate as part of an LTE/LTE-A network.

Thus, the method 1500 may provide for wireless communication. It should be noted that the method 1500 is just one implementation and that the operations of the method 1500 may be rearranged or otherwise modified such that other implementations are possible.

Figure 16:
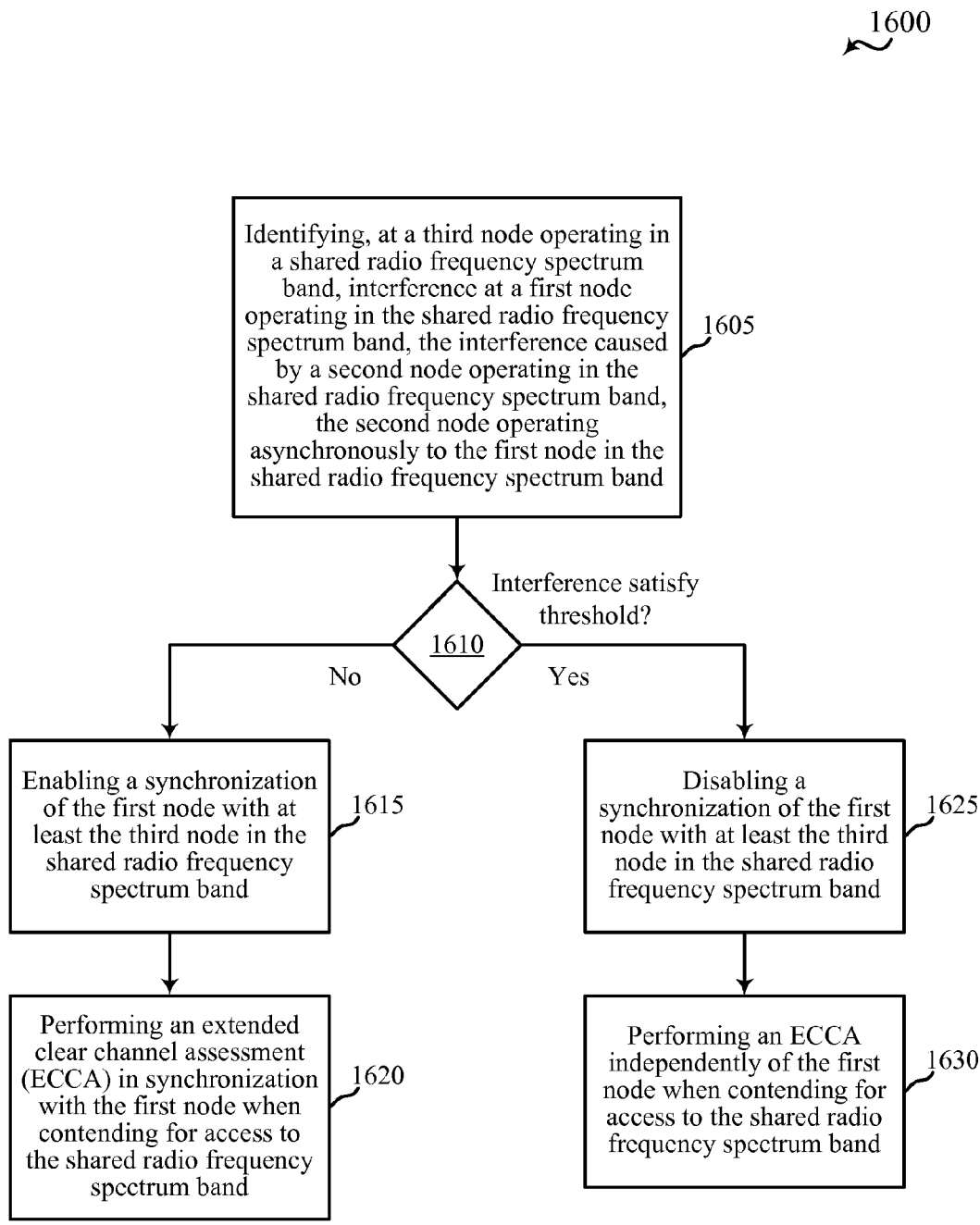
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations **105, 205, 205-*a*, 505, 505-*a*, 505-*b*, or 1205 described with reference to FIG. 1, 2, 5, or 12, or aspects of one or more of the apparatuses 705, 805, 905, or 1005 described with reference to FIG. 7, 8, 9, or 10**. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1605, the method 1600 may include identifying, at a third node operating in a shared radio frequency spectrum band, interference at a first node operating in a shared radio frequency spectrum band. The interference at the first node may be caused by a second node operating in the shared radio frequency spectrum band. The second node may operate asynchronously to the first node in the shared radio frequency spectrum band. The shared radio frequency spectrum band may include a radio frequency spectrum band for which transmitting apparatuses may need to contend for access because the radio frequency spectrum band is available for unlicensed use, such as Wi-Fi use.

In some examples, the third node may identify the interference at the first node based at least in part on an interference indication received from the first node. The interference indication may include, for example, a measured interference level, an indication that interference exists (which in some examples may take the form of an indication that a measured interference level satisfies a threshold), or an indication that the second node is detectable by the first node. When the interference indication includes a measured interference level, the third node may, for example, identify interference at the first node by comparing the measured interference level to a threshold. When the interference indication includes an indication that interference exists, the third node may, for example, identify interference at the first node based directly on the indication. When the interference indication includes an indication that the second node is detectable by the first node, the third node may, for example, identify interference at the first node based at least in part on the detectability of operation of the second node by the first node, or based at least in part on the identity of the second node, or based at least in part on a type of the second node.

In some examples, at least the first node and the third node may be connected via a fast backhaul and may be operable as a synchronized cluster of nodes. In these examples, each of the nodes capable of operating in the synchronized cluster of nodes may perform the method 1600 based on an indication or indications received from one or more other nodes capable of operating in the synchronized cluster of nodes. The indication or indications may be received by a node via the fast backhaul. In this manner, the method 1600 may be performed in a distributed manner.

The operation(s) at block 1605 may be performed using the wireless communication management module 720, 820, 920, 1020, or 1260 described with reference to FIG. 7, 8, 9, 10, or 12, the interference determination module 740, 840, 940, or 1040 described with reference to FIG. 7, 8, 9, or 10, or the distributed interference indication acquisition module 960 described with reference to FIG. 9.

At block 1610, the method 1600 may include determining whether the identified interference satisfies a threshold. When the identified interference fails to satisfy the threshold, the method 1600 may continue at block 1615. When the identified interference satisfies the threshold, the method 1600 may continue at block 1625. Alternatively, block 1610 may select a subsequent flow for the method 1600 based at least in part on whether interference at the first node exists. The operation(s) at block 1610 may be performed using the wireless communication management module 720, 820, 920, 1020, or 1260 described with reference to FIG. 7, 8, 9, 10, or 12, or the interference determination module 740, 840, 940, or 1040 described with reference to FIG. 7, 8, 9, or 10.

At block 1615 or 1625, the method 1600 may include adaptively enabling or disabling a synchronization of the first node with at least the third node in the shared radio frequency spectrum band. The adaptive enabling or disabling may be based at least in part on the determination made at block 1610. At block 1615, and when it is determined at block 1610 that the identified interference fails to satisfy the threshold, the method 1600 may include enabling the synchronization of the first node with at least the third node in the shared radio frequency spectrum band. The operation(s) at block 1615 may be performed using the wireless communication management module 720, 820, 920, 1020, or 1260 described with reference to FIG. 7, 8, 9, 10, or 12, or the adaptive node synchronization module 745, 845, 945, or 1045 described with reference to FIG. 7, 8, 9, or 10.

At block 1620, the method 1600 may include performing an ECCA in synchronization with the first node when contending for access to the shared radio frequency spectrum band. The operation(s) at block 1620 may be performed using the wireless communication management module 720, 820, 920, 1020, or 1260 described with reference to FIG. 7, 8, 9, 10, or 12, the adaptive node synchronization module 745, 845, 945, or 1045 described with reference to FIG. 7, 8, 9, or 10, or the ECCA management module 855, 955, or 1055 described with reference to FIG. 8, 9, or 10.

At block 1625, and when it is determined at block 1610 that the identified interference satisfies the threshold, the method 1600 may include disabling the synchronization of the first node with at least the third node in the shared radio frequency spectrum band. The operation(s) at block 1625 may be performed using the wireless communication management module 720, 820, 920, 1020, or 1260 described with reference to FIG. 7, 8, 9, 10, or 12, or the adaptive node synchronization module 745, 845, 945, or 1045 described with reference to FIG. 7, 8, 9, or 10.

At block 1630, the method 1600 may include performing an ECCA independently of the first node when contending for access to the shared radio frequency spectrum band. The operation(s) at block 1630 may be performed using the wireless communication management module 720, 820, 920, 1020, or 1260 described with reference to FIG. 7, 8, 9, 10, or 12, the adaptive node synchronization module 745, 845, 945, or 1045 described with reference to FIG. 7, 8, 9, or 10, or the ECCA management module 855, 955, or 1055 described with reference to FIG. 8, 9, or 10.

In some examples of the method 1600, the operations performed at each of blocks 1605, 1610, 1615, 1620, 1625, and/or 1630 may be performed by the third node. The third node may also perform the operations at blocks 1605, 1610, 1615, 1620, 1625, and/or 1630 for one or more nodes, other than the first node, that are capable of being synchronized with the third node (e.g., as a cluster of small cells).

In some examples of the method 1600, the first node and the second node may operate in the shared radio frequency spectrum band using different radio access technologies or a same radio access technology. In some examples, the first node may include a first base station, and the second node may include a second base station or a Wi-Fi node. When the second node includes a second base station, the first base station and the second base station may be members of different and unsynchronized operator deployments, or the first base station and the second base station may be unsynchronized base stations of a same operator deployment. In some examples, the third node may include a third base station, and the first base station and the third base station may be members of a same operator deployment. In some examples, one or more of the first base station, the second base station, and the third base station may operate as part of an LTE/LTE-A network.

Thus, the method 1600 may provide for wireless communication. It should be noted that the method 1600 is just one implementation and that the operations of the method 1600 may be rearranged or otherwise modified such that other implementations are possible.

Figure 17:
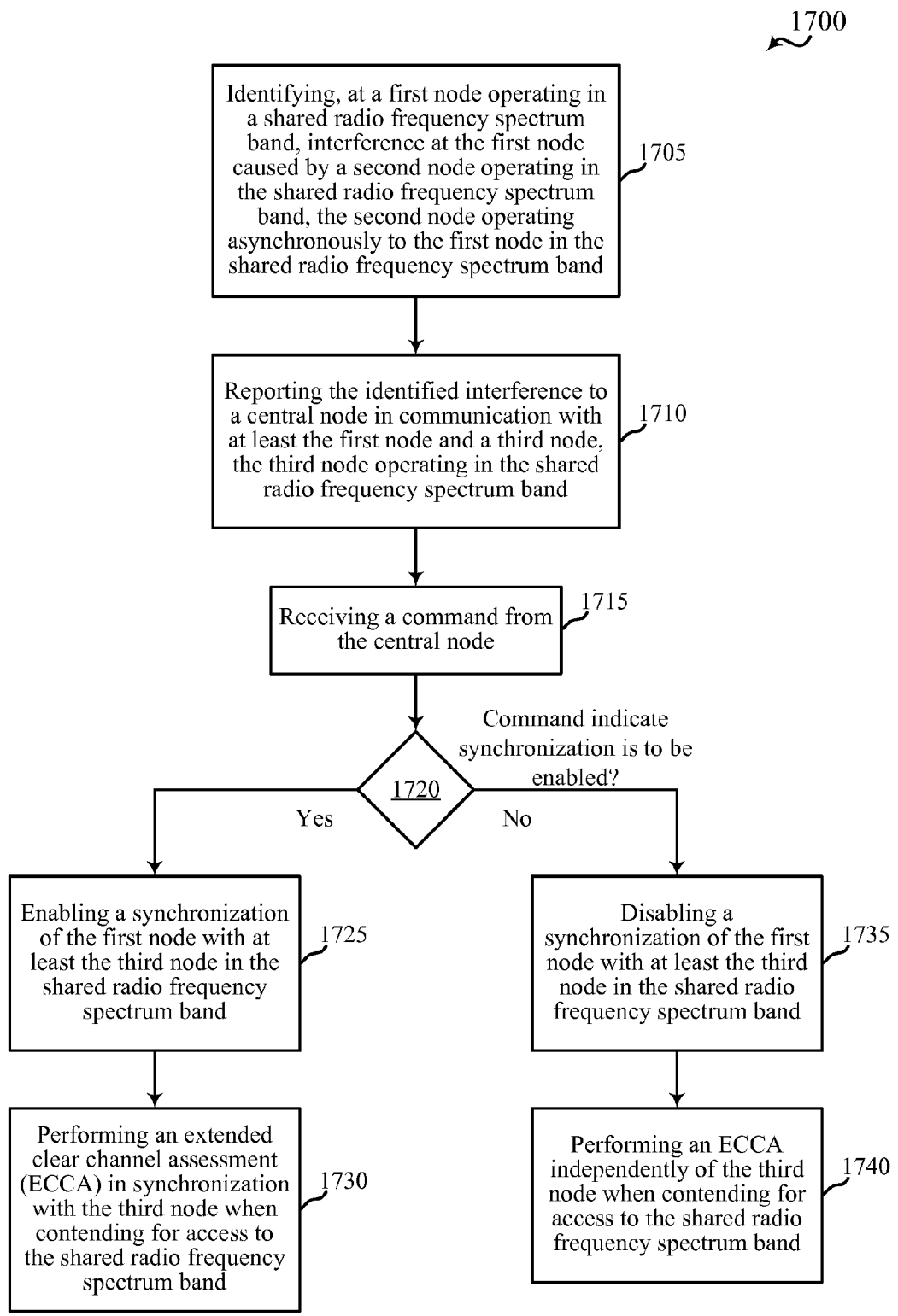
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations **105, 205, 205-*a*, 505, 505-*a*, 505-*b*, or 1205 described with reference to FIG. 1, 2, 5, or 12, or aspects of one or more of the apparatuses 705, 805, 905, or 1005 described with reference to FIG. 7, 8, 9, or 10.** In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1705, the method 1700 may include identifying, at a first node operating in a shared radio frequency spectrum band, interference at the first node caused by a second node operating in the shared radio frequency spectrum band. The second node may operate asynchronously to the first node in the shared radio frequency spectrum band. The shared radio frequency spectrum band may include a radio frequency spectrum band for which transmitting apparatuses may need to contend for access because the radio frequency spectrum band is available for unlicensed use, such as Wi-Fi use. The operation(s) at block 1705 may be performed using the wireless communication management module 720, 820, 920, 1020, or 1260 described with reference to FIG. 7, 8, 9, 10, or 12, or the interference determination module 740, 840, 940, or 1040 described with reference to FIG. 7, 8, 9, or 10.

At block 1710, the method 1700 may include reporting the identified interference to a central node in communication with at least the first node and a third node. The third node may also operate in the shared radio frequency spectrum band. In some examples, reporting the identified interference to the central node may include, for example, reporting a measured interference level, providing an indication that interference exists (which in some examples may take the form of an indication that a measured interference level satisfies a threshold), or providing an indication that the second node is detectable. The operation(s) at block 1710 may be performed using the wireless communication management module 720, 820, 920, 1020, or 1260 described with reference to FIG. 7, 8, 9, 10, or 12, the interference determination module 740, 840, 940, or 1040 described with reference to FIG. 7, 8, 9, or 10, or the reporting module 1060 described with reference to FIG. 10.

At block 1715, the method 1700 may include receiving a command from the central node. The command may indicate whether a synchronization of the first node with at least the third node, in the shared radio frequency spectrum band, is to be enabled. The command may be based at least in part on the identified interference. The operation(s) at block 1715 may be performed using the wireless communication management module 720, 820, 920, 1020, or 1260 described with reference to FIG. 7, 8, 9, 10, or 12, the interference determination module 740, 840, 940, or 1040 described with reference to FIG. 7, 8, 9, or 10, or the command processing module 1065 described with reference to FIG. 10.

At block 1720, the method 1700 may include determining whether the command received at block 1715 indicates that synchronization of the first node with at least the third node, in the shared radio frequency spectrum band, is to be enabled. When the command indicates that synchronization is to be enabled, the method 1700 may continue at block 1725. When the command indicates that synchronization is to be disabled, the method 1700 may continue at block 1735. The operation(s) at block 1720 may be performed using the wireless communication management module 720, 820, 920, 120, or 1260 described with reference to FIG. 7, 8, 9, 10, or 12, the interference determination module 740, 840, 940, or 1040 described with reference to FIG. 7, 8, 9, or 10, or the command processing module 1065 described with reference to FIG. 10.

At block 1725 or 1735, the method 1700 may include adaptively enabling or disabling a synchronization of the first node with at least the third node in the shared radio frequency spectrum band. The adaptive enabling or disabling may be based at least in part on the command received at block 1715 or the determination made at block 1720. At block 1725, and when it is determined at block 1720 that the command indicates that synchronization is to be enabled, the method 1700 may include enabling the synchronization of the first node with at least the third node in the shared radio frequency spectrum band. The operation (s) at block 1725 may be performed using the wireless communication management module 720, 820, 920, 1020, or 1260 described with reference to FIG. 7, 8, 9, 10, or 12, or the adaptive node synchronization module 745, 845, 945, or 1045 described with reference to FIG. 7, 8, 9, or 10.

At block 1730, the method 1700 may include performing an ECCA in synchronization with the third node when contending for access to the shared radio frequency spectrum band. The operation(s) at block 1730 may be performed using the wireless communication management module 720, 820, 920, 1020, or 1260 described with reference to FIG. 7, 8, 9, 10, or 12, the adaptive node synchronization module 745, 845, 945, or 1045 described with reference to FIG. 7, 8, 9, or 10, or the ECCA management module 855, 955, or 1055 described with reference to FIG. 8, 9, or 10.

At block 1735, and when it is determined at block 1720 that the command indicates that synchronization is to be disabled, the method 1700 may include disabling the synchronization of the first node with at least the third node in the shared radio frequency spectrum band. The operation(s) at block 1735 may be performed using the wireless communication management module 720, 820, 920, 1020, or 1260 described with reference to FIG. 7, 8, 9, 10, or 12, or the adaptive node synchronization module 745, 845, 945, or 1045 described with reference to FIG. 7, 8, 9, or 10.

At block 1740, the method 1700 may include performing an ECCA independently of the third node when contending for access to the shared radio frequency spectrum band. The operation(s) at block 1740 may be performed using the wireless communication management module 720, 820, 920, 1020, or 1260 described with reference to FIG. 7, 8, 9, 10, or 12, the adaptive node synchronization module 745, 845, 945, or 1045 described with reference to FIG. 7, 8, 9, or 10, or the ECCA management module 855, 955, or 1055 described with reference to FIG. 8, 9, or 10.

In some examples of the method 1700, the operations performed at each of blocks 1705, 1710, 1715, 1720, 1725, 1730, 1735, and/or 1740 may be performed by the first node. The first node and the second node may operate in the shared radio frequency spectrum band using different radio access technologies or a same radio access technology. In some examples, the first node may include a first base station, and the second node may include a second base station or a Wi-Fi node. When the second node includes a second base station, the first base station and the second base station may be members of different and unsynchronized operator deployments, or the first base station and the second base station may be unsynchronized base stations of a same operator deployment. In some examples, the third node may include a third base station, and the first base station and the third base station may be members of a same operator deployment. In some examples, one or more of the first base station, the second base station, and the third base station may operate as part of an LTE/LTE-A network.

Thus, the method 1700 may provide for wireless communication. It should be noted that the method 1700 is just one implementation and that the operations of the method 1700 may be rearranged or otherwise modified such that other implementations are possible.

Figure 18:
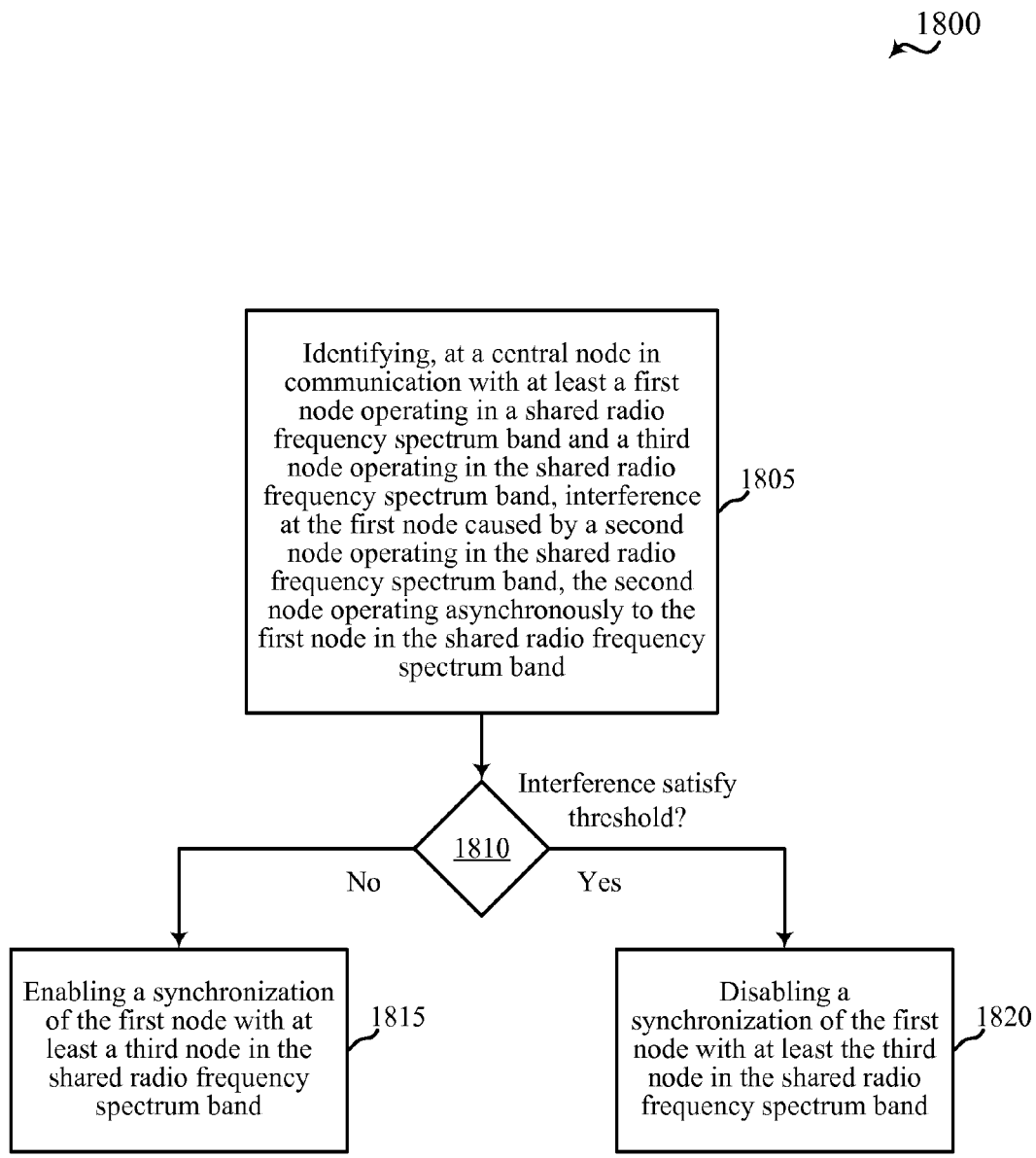
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the central nodes 135, 535, or 1335 described with reference to FIG. 1, 5, or 13, or aspects of the apparatus 715 or 1135 described with reference to FIG. 7 or 11. In some examples, a central node or apparatus may execute one or more sets of codes to control the functional elements of the central node or apparatus to perform the functions described below. Additionally or alternatively, the central node or apparatus may perform one or more of the functions described below using special-purpose hardware.

At block 1805, the method 1800 may include identifying, at a central node in communication with at least a first node operating in a shared radio frequency spectrum band and a third node operating in the shared radio frequency spectrum band, interference at the first node. The interference at the first node may be caused by a second node operating in the shared radio frequency spectrum band. The second node may operate asynchronously to the first node in the shared radio frequency spectrum band. The shared radio frequency spectrum band may include a radio frequency spectrum band for which transmitting apparatuses may need to contend for access because the radio frequency spectrum band is available for unlicensed use, such as Wi-Fi use.

In some examples, the central node may identify the interference at the first node based at least in part on an interference indication received from the first node. The interference indication may include, for example, a measured interference level, an indication that interference exists (which in some examples may take the form of an indication that a measured interference level satisfies a threshold), or an indication that the second node is detectable. When the interference indication includes a measured interference level, the central node may, for example, identify interference at the first node by comparing the measured interference level to a threshold. When the interference indication includes an indication that interference exists, the central node may, for example, identify interference at the first node based directly on the indication. When the interference indication includes an indication that the second node is detectable, the central node may, for example, identify interference at the first node based at least in part on the detectability of operation of the second node, or based at least in part on the identity of the second node, or based at least in part on a type of the second node.

The operation(s) at block 1805 may be performed using the wireless communication management module 720, 1120, or 1360 described with reference to FIG. 7, 11, or 13, or the interference determination module 1140 or interference indication acquisition module 1150 described with reference to FIG. 11.

At block 1810, the method 1800 may include determining whether the identified interference satisfies a threshold. When the identified interference fails to satisfy the threshold, the method 1800 may continue at block 1815. When the identified interference satisfies the threshold, the method 1800 may continue at block 1825. Alternatively, block 1810 may select a subsequent flow for the method 1800 based at least in part on whether interference at the first node exists. The operation(s) at block 1810 may be performed using the wireless communication management module 720, 1120, or 1360 described with reference to FIG. 7, 11, or 13, or the interference determination module 1140 described with reference to FIG. 11.

At block 1815 or 1820, the method 1800 may include adaptively enabling or disabling a synchronization of the first node with at least a third node in the shared radio frequency spectrum band. The adaptive enabling or disabling may be based at least in part on the determination made at block 1810. At block 1815, and when it is determined at block 1810 that the identified interference fails to satisfy the threshold, the method 1800 may include enabling the synchronization of the first node with at least the third node in the shared radio frequency spectrum band. In some examples, enabling the synchronization may include enabling a synchronization of ECCAs performed by the first node and the third node when contending for access to the shared radio frequency spectrum band. In some examples, enabling the synchronization may include transmitting a synchronization enablement command to the first node.

At block 1820, and when it is determined at block 1810 that the identified interference satisfies the threshold, the method 1800 may include disabling the synchronization of the first node with at least the third node in the shared radio frequency spectrum band. In some examples, disabling the synchronization may include disabling a synchronization of ECCAs performed by the first node and the third node when contending for access to the shared radio frequency spectrum band. In some examples, disabling the synchronization may include transmitting a synchronization disablement command to the first node.

The operation(s) at block 1815 or 1820 may be performed using the wireless communication management module 720, 1120, or 1360 described with reference to FIG. 7, 11, or 13, or the adaptive node synchronization module 1145, ECCA management module 1155, or command transmission management module 1160 described with reference to FIG. 11.

In some examples of the method 1800, the operations performed at each of blocks 1805, 1810, 1815, and/or 1820 may be performed by the central node. The central node may also perform the operations at blocks 1805, 1810, 1815, and/or 1820 for one or more nodes, other than the first node, that are capable of being synchronized with the first node and the third node.

In some examples of the method 1800, the first node and the second node may operate in the shared radio frequency spectrum band using different radio access technologies or a same radio access technology. In some examples, the first node may include a first base station, and the second node may include a second base station or a Wi-Fi node. When the second node includes a second base station, the first base station and the second base station may be members of different and unsynchronized operator deployments, or the first base station and the second base station may be unsynchronized base stations of a same operator deployment. In some examples, the third node may include a third base station, and the first base station and the third base station may be members of a same operator deployment. In some examples, one or more of the first base station, the second base station, and the third base station may operate as part of an LTE/LTE-A network.

Thus, the method 1800 may provide for wireless communication. It should be noted that the method 1800 is just one implementation and that the operations of the method 1800 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communications, comprising:
    identifying interference at a first node operating in a shared radio frequency spectrum band, the interference caused by a second node operating in the shared radio frequency spectrum band, the second node operating asynchronously to the first node in the shared radio frequency spectrum band; and
    adaptively enabling, based at least in part on the identified interference, a synchronization of the first node with at least a third node in the shared radio frequency spectrum band, wherein the synchronization of the first node with at least the third node comprises synchronizing a number of extended clear channel assessments (ECCAs) performed by the first node and the third node when contending for access to the shared radio frequency spectrum band.

2. The method of claim 1, wherein the adaptively enabling further comprises:
enabling the synchronization of the first node with at least the third node when the identified interference fails to satisfy a threshold; and
disabling the synchronization of the first node with at least the third node when the identified interference satisfies the threshold.

3. The method of claim 1, further comprising:
reporting the identified interference to a central node in communication with at least the first node and the third node;
wherein the adaptively enabling is based at least in part on a command received from the central node.

4. The method of claim 1, wherein a central node is in communication with at least the first node and the third node, and wherein the identifying and the adaptively enabling are performed by the central node.

5. The method of claim 4, wherein identifying the interference at the first node comprises:
receiving an interference indication from the first node.

6. The method of claim 4, wherein the adaptively enabling comprises:
transmitting a command to the first node.

7. The method of claim 1, wherein identifying the interference at the first node comprises receiving an interference indication from the first node at the third node, and wherein the identifying and the adaptively enabling are performed by the third node.

8. The method of claim 1, wherein the first node comprises a first base station and the second node comprises a second base station or a Wi-Fi node.

9. The method of claim 8, wherein the second node comprises the second base station, and wherein the first base station and the second base station are members of different and unsynchronized operator deployments.

10. The method of claim 1, wherein the first node comprises a first base station and the third node comprises a second base station, and wherein the first base station and the second base station are members of a same operator deployment.

11. The method of claim 10, wherein the first base station and the second base station are unsynchronized base stations of a same operator deployment.

12. The method of claim 1, wherein the first node and the second node operate in the shared radio frequency spectrum band using different radio access technologies or a same radio access technology.

13. The method of claim 1, wherein the adaptively enabling further comprises:
disabling the synchronization of the first node with at least the third node in the shared radio frequency spectrum band.

14. An apparatus for wireless communications, comprising:
means for identifying interference at a first node operating in a shared radio frequency spectrum band, the interference caused by a second node operating in the shared radio frequency spectrum band, the second node operating asynchronously to the first node in the shared radio frequency spectrum band; and
means for adaptively enabling, based at least in part on the identified interference, a synchronization of the first node with at least a third node in the shared radio frequency spectrum band, wherein the synchronization of the first node with at least the third node comprises synchronizing a number of extended clear channel assessments (ECCAs) performed by the first node and the third node when contending for access to the shared radio frequency spectrum band.

15. The apparatus of claim 14, wherein the means for adaptively enabling further comprises:
means for enabling the synchronization of the first node with at least the third node when the identified interference fails to satisfy a threshold; and
means for disabling the synchronization of the first node with at least the third node when the identified interference satisfies the threshold.

16. The apparatus of claim 14, further comprising:
means for reporting the identified interference to a central node in communication with at least the first node and the third node;
wherein the adaptively enabling is based at least in part on a command received from the central node.

17. The apparatus of claim 14, wherein a central node is in communication with at least the first node and the third node, and wherein the central node comprises the means for identifying and the means for adaptively enabling.

18. The apparatus of claim 17, wherein the means for identifying interference at the first node comprises means for receiving an interference indication from the first node.

19. The apparatus of claim 17, wherein the means for adaptively enabling comprises:
means for transmitting a command to the first node.

20. The apparatus of claim 14, wherein the means for identifying interference at the first node comprises means for receiving an interference indication from the first node at the third node, and wherein the third node comprises the means for identifying and the means for adaptively enabling.

21. An apparatus for wireless communications, comprising:
a processor; and
memory coupled to the processor, and instructions stored in the memory and executable by the processor to:
identify interference at a first node operating in a shared radio frequency spectrum band, the interference caused by a second node operating in the shared radio frequency spectrum band, the second node operating asynchronously to the first node in the shared radio frequency spectrum band; and
adaptively enable, based at least in part on the identified interference, a synchronization of the first node with at least a third node in the shared radio frequency spectrum band, wherein the synchronization of the first node with at least the third node comprises synchronizing a number of extended clear channel assessments (ECCAs) performed by the first node and the third node when contending for access to the shared radio frequency spectrum band.

22. The apparatus of claim 21, wherein the instructions executable by the processor to adaptively enable comprise instructions executable by the processor to:
enable the synchronization of the first node with at least the third node when the identified interference fails to satisfy a threshold; and
disable the synchronization of the first node with at least the third node when the identified interference satisfies the threshold.

23. The apparatus of claim 21, wherein the instructions are executable by the processor to:

report the identified interference to a central node in communication with at least the first node and the third node;

wherein the adaptively enabling is based at least in part on a command received from the central node.

24. The apparatus of claim 21, wherein a central node is in communication with at least the first node and the third node, wherein the apparatus includes the central node, and wherein the processor is included in the central node.

25. The apparatus of claim 24, wherein the instructions executable by the processor to identify interference at the first node include instructions executable by the processor to:

receive an interference indication from the first node.

26. The apparatus of claim 24, wherein the instructions executable by the processor to adaptively enable comprise instructions executable by the processor to:

transmit a command to the first node.

27. The apparatus of claim 21, wherein the instructions executable by the processor to identify interference at the first node comprise instructions executable by the processor to receive an interference indication from the first node at the third node, wherein the apparatus includes the third node, and wherein the processor is included in the third node.

28. A non-transitory computer-readable medium storing code for wireless communications, the code comprising instructions executable by a processor to:

identify interference at a first node operating in a shared radio frequency spectrum band, the interference caused by a second node operating in the shared radio frequency spectrum band, the second node operating asynchronously to the first node in the shared radio frequency spectrum band; and adaptively enable, based at least in part on the identified interference, a synchronization of the first node with at least a third node in the shared radio frequency spectrum band, wherein the synchronization of the first node with at least the third node comprises synchronizing a number of extended clear channel assessments (ECCAs) performed by the first node and the third node when contending for access to the shared radio frequency spectrum band.

* * * * *